US011326040B2

(12) United States Patent
Nguyen et al.

(10) Patent No.: US 11,326,040 B2
(45) Date of Patent: May 10, 2022

(54) SILICON-CONTAINING HALOGENATED ELASTOMERS

(71) Applicant: 3M INNOVATIVE PROPERTIES COMPANY, St. Paul, MN (US)

(72) Inventors: Tho Q. Nguyen, Bloomington, MN (US); Tatsuo Fukushi, Woodbury, MN (US); Allen M. Sohlo, Lindstrom, MN (US); Mary J. Swierczek, Lake Elmo, MN (US); Steven J. Wellner, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 265 days.

(21) Appl. No.: 16/473,031

(22) PCT Filed: Dec. 22, 2017

(86) PCT No.: PCT/US2017/068142
§ 371 (c)(1),
(2) Date: Jun. 24, 2019

(87) PCT Pub. No.: WO2018/125790
PCT Pub. Date: Jul. 5, 2018

(65) Prior Publication Data
US 2019/0330444 A1 Oct. 31, 2019

Related U.S. Application Data

(60) Provisional application No. 62/439,664, filed on Dec. 28, 2016, provisional application No. 62/470,418, filed on Mar. 13, 2017.

(51) Int. Cl.
*C08K 3/22* (2006.01)
*C08K 3/36* (2006.01)

(52) U.S. Cl.
CPC ............... *C08K 3/22* (2013.01); *C08K 3/36* (2013.01); *C08K 2003/222* (2013.01); *C08K 2003/2206* (2013.01); *C08K 2201/019* (2013.01)

(58) Field of Classification Search
None
See application file for complete search history.

(56) References Cited

U.S. PATENT DOCUMENTS

| 3,876,654 | A | 4/1975 | Pattison |
| 4,233,421 | A | 11/1980 | Worm |
| 4,912,171 | A | 3/1990 | Grootaert |
| 4,981,912 | A | 1/1991 | Kurihara |
| 5,086,123 | A | 2/1992 | Guenthner |
| 5,225,504 | A | 7/1993 | Tatsu |
| 5,262,490 | A | 11/1993 | Kolb |
| 5,591,804 | A | 1/1997 | Coggio |
| 5,929,169 | A | 7/1999 | Jing |
| 6,579,929 | B1* | 6/2003 | Cole ............ C08K 9/04 524/492 |
| 7,253,236 | B2 | 8/2007 | Paglia |
| 7,279,530 | B2 | 10/2007 | Higashira |
| 7,977,433 | B2 | 7/2011 | Sano |
| 8,013,064 | B2 | 9/2011 | Nakazato |
| 2009/0093590 | A1 | 4/2009 | Okazaki |
| 2010/0166996 | A1* | 7/2010 | Chorvath ............ C08L 83/08 428/36.91 |
| 2010/0311908 | A1 | 12/2010 | Hirose |
| 2013/0020286 | A1 | 1/2013 | Yeon |
| 2013/0102869 | A1 | 4/2013 | Kordis |

FOREIGN PATENT DOCUMENTS

| EP | 0434046 | 6/1991 |
| JP | 2002-293950 | 10/2002 |
| WO | WO 2005-090470 | 9/2005 |
| WO | WO 2015-122537 | 8/2015 |
| WO | WO 2016-100420 | 6/2016 |
| WO | WO 2016-100421 | 6/2016 |
| WO | WO 2017-013379 | 1/2017 |
| WO | WO 2018-136324 | 7/2018 |
| WO | WO 2018-136331 | 7/2018 |
| WO | WO 2018-136332 | 7/2018 |

OTHER PUBLICATIONS

Machine translation of WO 2015122537 (Year: 2015).*
XP002779269, Database WPI Week 201558 Thomson Scientific, 2014, 3 pages.
XP002779270, Database WPI Week 200319 Thomson Scientific, 2017, 4 pages.
XP002779285, Database WPI Week 200573 Thomson Scientific, 2017, 5 pages.
International Search report for PCT International Application No. PCT/US2017/068142 dated Apr. 18, 2018, 5 pages.

* cited by examiner

Primary Examiner — Robert T Butcher
(74) Attorney, Agent, or Firm — Julie Lapos-Kuchar

(57) ABSTRACT

Described herein is curable composition comprising a halogenated amorphous polymer having at least 25% halogen by weight; at least 0.5 phr of an acid acceptor; at least 0.01 phr of silicon-containing compound; and a dehydrohalogenation cure system. Upon curing, a silicon-containing superficial layer forms, which can provide increased durability, non-tackiness, and a matte finish to the cured elastomer.

19 Claims, 4 Drawing Sheets

10μm

10μm

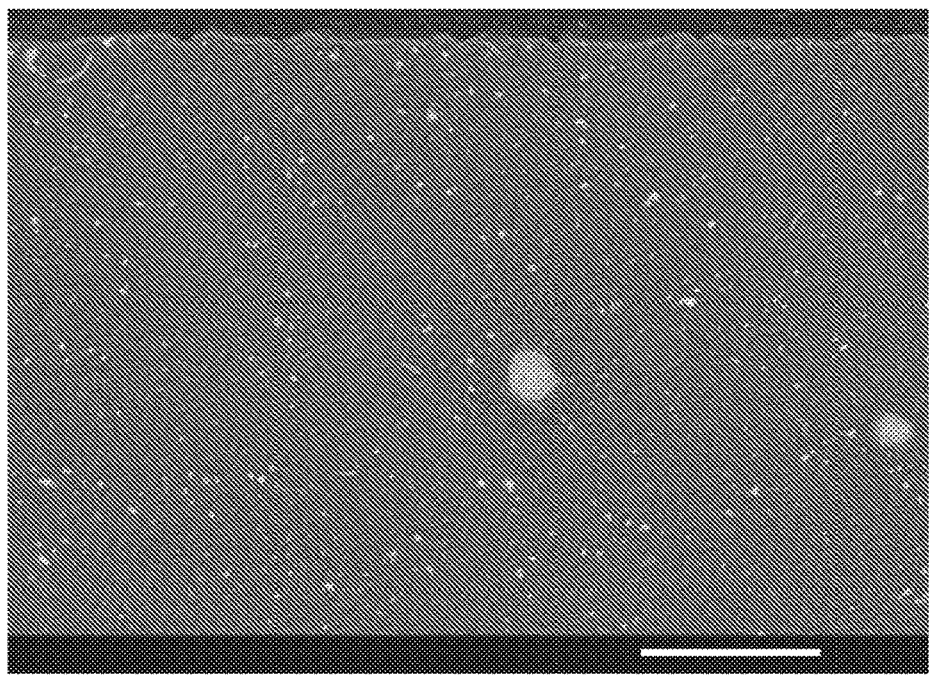
FIG. 7   50μm
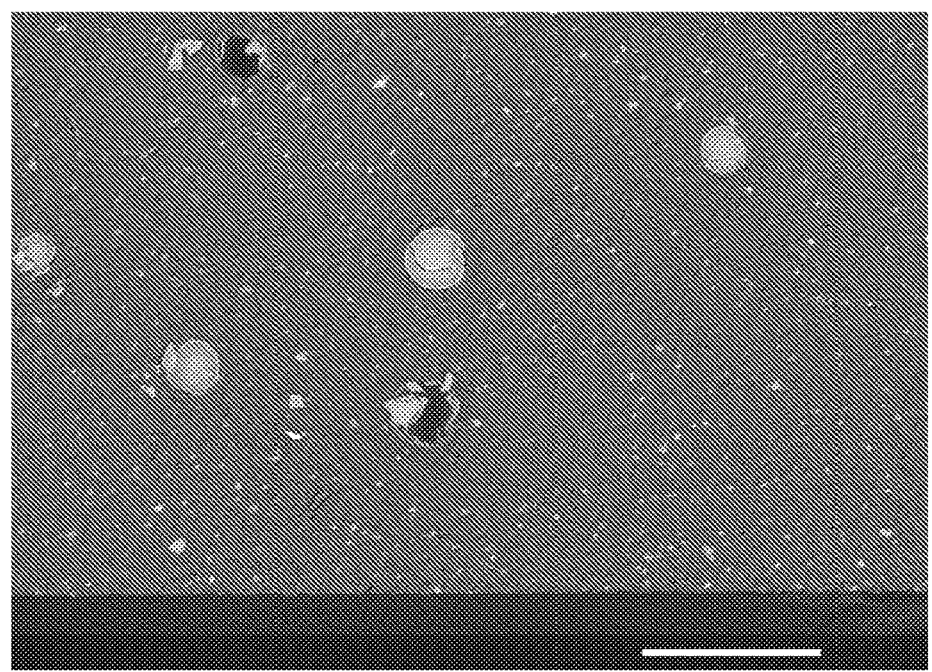
FIG. 8   50μm

SILICON-CONTAINING HALOGENATED ELASTOMERS

CROSS REFERENCE TO RELATED APPLICATIONS

This application is a national stage filing under 35 U.S.C. 371 of PCT/US2017/068142, filed Dec. 22, 2017, which claims the benefit of U.S. Application No. 62/439,664, filed Dec. 28, 2016 and U.S. Application No. 62/470,418, filed Mar. 13, 2017, the disclosures of which are incorporated by reference in their entirety herein.

TECHNICAL FIELD

Halogenated elastomers having a superficial layer comprising silicon are described including precursor compositions and methods of making such elastomers.

SUMMARY

Fluoroelastomers are widely used as shaped or molded parts in sealing applications (e.g., O-rings, gaskets, and packings) and in contact applications (e.g., belts, stoppers for printer heads, and head controllers of hard disk drives). Thus, it is important that the fluoroelastomers have non tacky surfaces.

Surface treatment to the fluoroelastomer has been done to reduce the surface stickiness while maintaining the elastomeric properties. In one such treatment, a molded and cured fluoroelastomer is immersed in a curating agent and post-cured. This treatment results in a higher level of crosslinking at the fluoroelastomer surface, which can reduce stickiness. For example, U.S. Pat. No. 4,981,912 (Kurihara) teaches a fluoroelastomer which is cured with a first crosslinking agent then the surface is contacted with a second crosslinking agent such that a first partial crosslink density has a uniform density across the shaped article while a second partial crosslink density continuously decreases from the surface toward the interior of the shaped article.

There is a desire to identify halogenated materials that have reduced stickiness. In one embodiment, the materials would not involve additional process steps and/or are more cost effective to produce. In addition, and/or alternatively, the materials have good mechanical properties, such as improved durability.

In one aspect, a curable halogenated amorphous polymer composition is described, the composition comprising:
  (a) a halogenated amorphous polymer having at least 25% halogen by weight;
  (b) at least 0.5 phr of an acid acceptor;
  (c) at least 0.01 phr of silicon-containing compound; and
  (d) a dehydrohalogenation cure system.

In another aspect, an article is described, the article comprising
  a halogenated elastomer having a superficial layer comprising silicon, wherein the halogenated elastomer comprises at least 0.01 phr of silicon-containing inorganic compound in the bulk; and there is a concentration gradient of silicon dioxide, which decreases from the superficial layer toward the bulk.

The above summary is not intended to describe each embodiment. The details of one or more embodiments of the invention are also set forth in the description below. Other features, objects, and advantages will be apparent from the description and from the claims.

DESCRIPTION OF FIGURES

FIGS. 7 and 8 is a scanning electron micrograph of a cross-section of EX-18.

DETAILED DESCRIPTION

Figure 1:
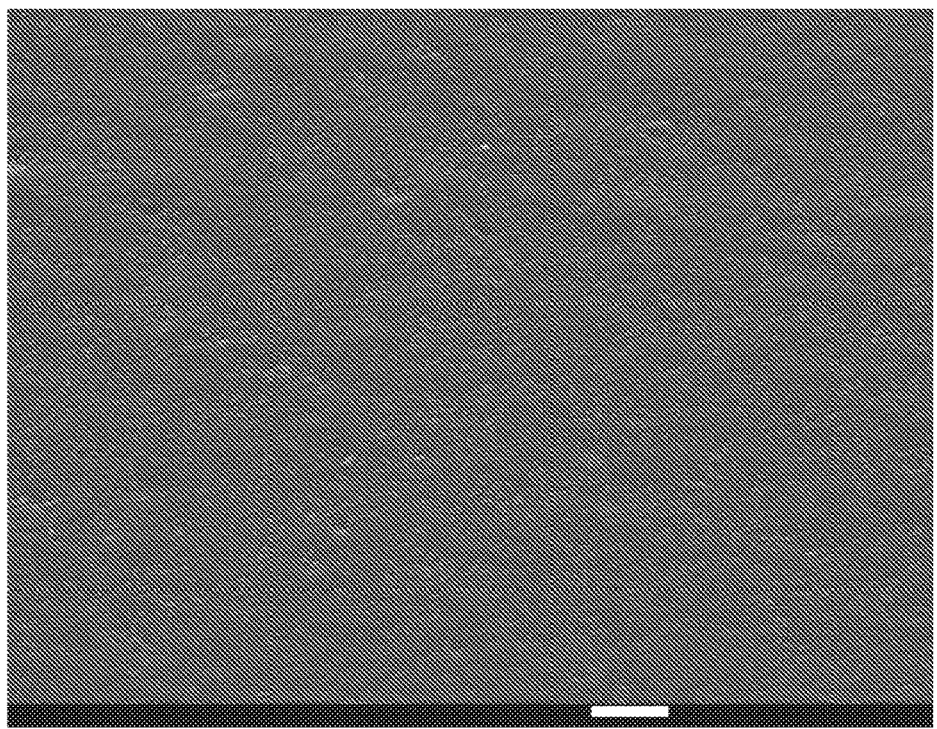
FIG. 1 is a scanning electron micrograph of a top-view of CE-12.

As used herein, the term
"a", "an", and "the" are used interchangeably and mean one or more; and
"and/or" is used to indicate one or both stated cases may occur, for example A and/or B includes, (A and B) and (A or B);
"backbone" refers to the main continuous chain of the polymer;
"copolymer" refers to a polymer comprising repeating units derived from the recited monomers (comonomers) without excluding the option of other repeating units being present that derive from other monomers (comonomers) not explicitly recited, such as terpolymers or quadpolymers;
"crosslinking" refers to connecting two pre-formed polymer chains using chemical bonds or chemical groups;
"interpolymerized" refers to monomers that are polymerized together to form a polymer backbone;
"monomer" is a molecule which can undergo polymerization which then form part of the essential structure of a polymer;
organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate.
"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and
"polymer" refers to a macrostructure having a number average molecular weight (Mn) of at least 20,000 daltons, at least 3,000 daltons, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

It is known that during curing of an amorphous fluoropolymer or exposure of the fluoroelastomer to high temperatures, hydrogen fluoride is generated. Thus, an acid acceptor is added to neutralize the HF. A sufficient amount of acid acceptor should be used. If too little is used, then the elastomer would not have the desired curing for forming articles or obtaining sealing performance. If too much is used, then the properties of the resulting fluoroelastomer can be compromised. For example, the fluoroelastomer can swell in the presence of water.

In the present disclosure, it has been discovered that when a small amount of acid acceptor is used in a halogenated polymer in the presence of a silicon-containing compound and under certain processing conditions, a superficial layer comprising silicon forms at or near the surface of the halogenated polymer. Halogenated polymers comprising such a superficial layer have been found to have reduced stickiness and/or improved durability.

Acid Acceptor

The acid acceptor can be an inorganic base such as metal oxide or metal hydroxide or a blend of the inorganic base and an organic acid acceptor. In one embodiment, the metal is a divalent metal. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, alkali stearates (such as sodium stearate), tertiary amines, and magnesium oxalate. Particularly suitable acid acceptors include magnesium oxide, calcium oxide, and zinc oxide. Blends of acid acceptors may be used as well.

In one embodiment, the acid acceptor is used in an amount from at least 0.1, 0.5, or even 1 phr (parts by weight per hundred parts by weight of rubber or grams per 100 grams of the amorphous halogenated polymer). In one embodiment, the acid acceptor is used in an amount of at most 12, 10, 9, 8, 7, 6, 5, 4, or even 3 phr.

In one embodiment, the acid acceptor is used in an amount from at least 0.1, 0.5, or even 1% wt (weight) based on the weight of halogenated polymer. In one embodiment, the acid acceptor is used in an amount of at most 12, 10, 9, 8, 7, 6, 5, or even 3% wt based on the weight of halogenated polymer. However, because the acid acceptors have different activity, the amount of acid acceptor will generally depend on the acid acceptor used. The activity can be based on the acid acceptor's basicity, surface structure, and/or surface area. For example, magnesium oxide can be low-activity, which has a low surface area or high-activity, which has a high surface area.

Silicon-Containing Compound

The silicon-containing compound of the present disclosure is a compound that comprises silicon, including silicon metalloids. The silicon-containing compound may be hydrated, hydroxylated, or crosslinked. In one embodiment, the silicon-containing compound comprises Si—O—X wherein X is an organic group or another metal compound, such as Si, Al, B, etc. The number of Si—O—X bonds surrounding the Si atom can be 1, 2, 3, or 4.

The silicon-containing compound of the present disclosure can be amorphous, crystalline, semi-crystalline, or a glass ceramic, where glass ceramics have an amorphous phase and one or more crystalline phases.

In one embodiment, the silicon-containing compound of the present disclosure is a particulate, meaning that individual particles of the silicon-containing compound are observed. In one embodiment, the silicon-containing compounds are nanoparticles, having an average diameter of at least 3 nm, 5 nm, 10 nm, 15 nm, or even 25 nm; at most about 50 nm, 100 nm, 200 nm, or even 500 nm. In one embodiment, the silicon-containing compounds are microparticles, having an average diameter of at least 0.5 micron (μm), 0.7 μm, 1 μm, or even 2 μm; at most about 50 μm, 100 μm, 500 μm, 750 μm, or even 1 mm. The diameters listed above are for the primary particle size. In some embodiments, the primary particles can be aggregated or agglomerated together to form larger particles, wherein the primary particles are essentially irreversibly bonded together in the form of aggregate. In materials such as fumed silica, pyrogenic silica, and precipitated silica which form aggregate, it is not possible to straightforwardly separate the aggregates into their individual primary particles. The average particle size may be determined using techniques known in the art such as light scatter or microscopy. In one embodiment, the particles are spherically shaped. However, in some embodiments, the particle may be non-spherical in shape such as a whicker, platelet, or fiber, engineered shapes, or even irregular in shapes. In one embodiment, the particles are hollow, such as a glass bubble, which comprises a glass shell and a hollow core. In one embodiment, the inorganic silicon-containing particulates are surface treated with organic moieties, such as particles treated with a dimethyl, dichloro silane.

Exemplary silicon-containing compounds include: metal silicates such as calcium silicate, sodium silicate, borosilicate, lithium disilicate, and potassium silicate; glasses such as soda lime glass, borosilicate glass, Z-glass, E-glass, titanate- and aluminate-based glasses; glass beads; glass frit; silica such as fumed silica, pyrogenic silica, precipitated silica, and silica fume, metal silicon, and combinations thereof.

Examples of commercially available silicon-containing compounds include glass available under the trade designation "NEXTERION GLASS D" from Schott Industries, Kansas City, Mo., and glass available under the trade designation "PYREX" from Corning Incorporated, New York, N.Y.; colloidal silica sols available from Nalco Chemical Co. (Naperville, Ill.) under the trade designation "NALCO COLLOIDAL SILICAS", such as NALCO products 1040, 1042, 1050, 1060, 2327 and 2329; fumed silica available under the trade designations "AERMIL" and "AEROSIL 972" from Evonik Degussa Corp., Essen, Germany and "CAB-O-SIL TS 530" available from Cabot Corp., Boston, Mass.; precipitated silica available under the "HI-SIL" trade designations such as HI-SIL 210, HI-SIL 233, HI-SIL 532EP, and HI-SIL ABS, and Silene 732D, which are all available from PPG Industries, Pittsburg, Pa.; fused silica available from under the trade designations "3M FUSED SILICA 550", "3M FUSED SILICA 20", and "3M FUSED SILICA 40" available from 3M Co.; glass beads available from under the trade designations "3M REFLECTIVE GLASS BEADS" available from 3M Co.; hollow glass bubbles available under the trade designation "3M GLASS BUBBLES iM16K" from 3M Company, St. Paul, Minn. and those available under the trade designations "Q-CEL" and "SHERICEL" from Potters Industries, LLC, Valley Forge, Pa.; ceramic microspheres available under the trade designation "3M CERAMIC MICROSPHERES W-210", "3M CERAMIC MICROSPHERES W-410", and "3M CERAMIC MICROSPHERES W-610" all available from 3M Company, St. Paul, Minn.; silicon dioxide available under the trade designation "AEMIL 90" from Evonik Degussa Corp.; ground quartz available under the trade designation "MIN-U-SIL 5M" available from U.S. Silica Co., Frederick, Md.; and silica aerogel powders available under the trade designation "JIOS AEROVA AEROGEL POWDER" available from JIOS Aerogel USA, Inc., Irvine, Calif. and "LUMIRA" and "ENOVA" aerogels available from Cabot Corp., Boston, Mass.

Commercially available silicates include: magnesium silicate available under the trade designation "MIITRON VAPOR R" and "TALC" available from Luzenac America Inc., Three Forks, Mont.; calcium silicate available under the trade designations "NYAD", "NYGLOS", "WOLLASTOCOAT", and "WOLLASTOKUP" available from NYCO Minerals, Willsboro, N.Y.; and sodium aluminosilicate available under the trade designation "ZEOLEX" from J. M. Huber Corp., Edison, N.J.

In one embodiment, the silicon-containing compound is not a particulate. In one embodiment, the silicon-containing compound is a liquid at ambient conditions. Non particulate silicon-containing compounds include alkoxides, for example, alkoxysilanes such as tetraethylorthosilicate (TEOS), methyltrimethoxysilane, alkytrialkoxysilane, and oligomers thereof.

In one embodiment, the silicon-containing compound is used in an amount from at least 0.1, 0.2, 0.5, or even 1% wt based on the weight of halogenated polymer. In one embodiment, the silicon-containing compound is used in an amount less than 10, 7, 5, or even 3% wt based on the weight of halogenated polymer. Because the silicon-containing compound may have different activity in the present disclosure, the amount of silicon-containing compound can depend on the silicon-containing compound used. Such factors that may influence the activity include, which silicon-containing compound is used, the surface area of the silicon-containing compound if a particulate, and/or the amount of Si and/or SiO available for reaction.

In one embodiment, the silicon-containing compound is used in an amount from at least 0.1, 0.2, 0.5, or even 1 phr. In one embodiment, the silicon-containing compound is used in an amount of at most 10, 9, 8, 7, 6, 5, 4, or even 3 phr.

Amorphous Halogenated Polymer

The polymer for use in connection with the present disclosure is a substantially amorphous polymer that shows hardly any melting point if at all. Such fluoropolymers are particularly suitable for providing elastomers, which are typically obtained upon curing of the amorphous polymer, also referred to as elastomer gum.

The present disclosure is directed toward amorphous halogenated polymers. The amorphous polymers may be perhalogenated (meaning that the carbons on the polymer backbone comprise halogens, such as F, Cl, Br, or I, but not H) or partially halogenated (meaning that the carbons on the fluoropolymer backbone comprise both hydrogen and halogen atoms). In one embodiment, the amorphous polymer comprises at least 25, 30, 40, 45, 50, or even 60% by weight of halogen. In one embodiment, the amorphous polymer comprises at least 40%, 50%, 60%, or even 70% C-halogen bonds relative to the total C—H bonds in the polymer backbone. In some embodiments, other atoms are present along the polymer backbone including, e.g., catenated oxygen atoms.

Exemplary polymers include fluoropolymers and chlorinated polymers.

Amorphous chlorinated polymers include epichlohydrin polymers, chloropolyethylene (CM) and chlorosulfonyl polyethylene (CSM). Exemplary epichlohydrin polymers include polychloromethyl oxirane (epichlorohydrin polymer, CO), ethylene oxide and chlorometyl oxirane (epichlorohydrin copolymer, ECO) and epichlorohydrin-ethylene oxide-allylglycylether (epichlorohydrin terpolymer, GECO).

Examples of fluoropolymers for use in this disclosure include polymers of one or more fluorinated monomers optionally in combination with one or more non-fluorinated monomers. Examples of fluorinated monomers include fluorinated $C_2$-$C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$-$C_8$ olefins such as ethylene (E) and propylene (P).

Examples of perfluorinated vinyl ethers that can be used in the disclosure include those that correspond to the formula:

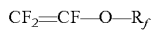

$$CF_2=CF-O-R_f$$

wherein $R_f$ represents a perfluorinated aliphatic group that may contain one or more oxygen atoms.

Particularly preferred perfluorinated vinyl ethers correspond to the formula:

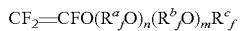

$$CF_2=CFO(R^a_fO)_n(R^b_fO)_mR^c_f$$

wherein $R^a_f$ and $R^b_f$ are different linear or branched perfluoroalkylene groups of 1-6 carbon atoms, in particular 2 to 6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable fluoroalkyl vinyl monomers correspond to the general formula:

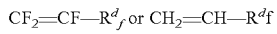

$$CF_2=CF-R^d_f \text{ or } CH_2=CH-R^d_f$$

wherein $R^d_f$ represents a perfluoroalkyl group of 1 to 10, preferably 1 to 5 carbon atoms. A typical example of a fluoroalkyl vinyl monomer is hexafluoropropylene.

In one embodiment, the amorphous fluoropolymer of the present disclosure also comprises carbon-carbon double bonds and/or is capable of forming carbon-carbon double bonds along the polymer chain. In one embodiment, the partially fluorinated amorphous fluoropolymer comprises carbon-carbon double bonds along the backbone of the partially fluorinated amorphous fluoropolymer or is capable of forming carbon-carbon double bonds along the backbone of the partially fluorinated amorphous fluoropolymer. In another embodiment, the partially fluorinated amorphous fluoropolymer comprises carbon-carbon double bonds or is capable of forming carbon-carbon double bonds in a pendent group off of the backbone of the partially fluorinated amorphous fluoropolymer.

The fluoropolymer capable of forming carbon-carbon double bonds means that the fluoropolymer contains units capable of forming double bonds. Such units include, for example, two adjacent carbons, along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a halide, an alkoxide, a hydroxide, a tosylate, a mesylate, an amine, an ammonium, a sulfide, a sulfonium, a sulfoxide, a sulfone, and combinations thereof.

In one embodiment, amorphous fluoropolymers include for example copolymers of vinylidene fluoride and at least one terminally ethylenically-unsaturated fluoromonomer containing at least one fluorine atom substituent on each double-bonded carbon atom, each carbon atom of the fluoromonomer being substituted only with fluorine and optionally with chlorine, hydrogen, a lower fluoroalkyl radical, or a lower fluoroalkoxy radical. In one embodiment, amorphous fluoropolymers include for example a perfluorinated or perhalogentated monomer and at least one partially fluorinated or nonfluorinated monomer. Specific examples of copolymers include for example copolymers having a combination of monomers as follows: VDF-HFP, TFE-P, VDF-TFE-HFP, VDF-PVE, VDF-TFE-PVE, VDF-TFE-P, TFE-PVE, E-TFE, E-TFE-PVE, and any of the aforementioned copolymers further including units derived from a chlorine containing monomer such as CTFE. Still further examples of suitable amorphous copolymers include copolymers having a combination of monomers such as in CTFE-P.

Preferred amorphous fluoropolymers generally comprise from 20 to 85%, preferably 50 to 80% by moles of repeating units derived from VDF, TFE, HFP, and/or CTFE, copolymerized with one or more other fluorinated ethylenically unsaturated monomer and/or one or more non fluorinated $C_2$-$C_5$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

In one embodiment, the fluorinated amorphous polymer is a block copolymer comprising an amorphous fluoropolymer segment. The block copolymer is processed as a traditional elastomeric material, meaning that the block copolymer can be processed with a two-roll mill or an internal mixer. Mill blending is a process that rubber manufacturers use to combine the polymer gum with the requisite curing agents and/or additives. In order to be mill blended, the polymer must have a sufficient modulus. In other words, not too soft that it sticks to the mill, and not too stiff that it cannot be banded onto mill. In one embodiment, the block copolymer comprising an amorphous fluoropolymer segment has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz).

In one embodiment, the block copolymer comprises a first block, A block, which is a semi-crystalline segment. If studied under a differential scanning calorimetry (DSC), this block would have at least one melting point temperature ($T_m$) of greater than 70° C. and a measurable enthalpy, for example, greater than 0 J/g (Joules/gram). The second block, or B block, is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC. In one embodiment, the A block is a copolymer derived from at least the following monomers: tetrafluoroethylene (TFE), hexafluoropropylene (HFP), and vinylidene fluoride (VDF). In one embodiment, the A block comprises 30-85 wt (weight) % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF. In one embodiment, the B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. Monomers, in addition, to those mentioned above, may be included in the A and/or B blocks. Generally, the weight average of the A block and B block are independently selected from at least 1000, 5000, 10000, or even 25000 daltons; and at most 400000, 600000, or even 800000 daltons. Such block copolymers are disclosed in WO 2017/013379 (Mitchell et al.); and U.S. Provisional Appl. Nos. 62/447,675, 62/447,636, and 62/447,664, each filed 18 Jan. 2017; all of which are incorporated herein by reference.

In one embodiment, the fluorinated amorphous polymer is further derived from a bromine and/or iodine-containing cure site monomer, which can participate in a cure reaction, such as a peroxide curing reaction.

Such bromine and/or iodine-containing cure site monomers include:

(a) bromo- or iodo-(per)fluoroalkyl-(per)fluorovinylethers having the formula:

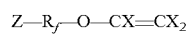

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2$—O—$CF$=$CF_2$, $BrCF_2CF_2$—O—$CF$=$CF_2$, $BrCF_2CF_2CF_2$—O—$CF$=$CF_2$, $CF_3CFBrCF_2$—O—$CF$=$CF_2$, $ICF_2CF_2CH$=$CH_2$, $ICF_2$ $CF_2CF_2$—O—$CF$=$CF_2$, and the like;

(b) bromo- or iodo perfluoroolefins such as those having the formula:

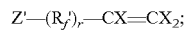

wherein each X independently represents H or F, Z' is Br or I, $R'_f$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo-olefins such as vinyl bromide and 4-bromo-1-butene.

In one embodiment, the amorphous fluoropolymer is polymerized in the presence of a bromine and/or iodine-containing chain transfer agent, as is known in the art, such as those having the formula $R_fP_x$, wherein P is Br or I, preferably I, $R_f$ is an x-valent alkyl radical having from 1 to 12 carbon atoms, which, optionally may also contain chlorine atoms. Typically, x is 1 or 2. Useful chain transfer agents include perfluorinated alkyl monoiodide, perfluorinated alkyl diiodide, perfluorinated alkyl monobromide, perfluorinated alkyl dibromide, and combinations thereof. Specific examples include $CF_2Br_2$, $Br(CF_2)_2Br$, $Br(CF_2)_4Br$, $CF_2ClBr$, $CF_3CFBrCF_2Br$, $I(CF_2)_nI$ wherein n is an integer from 3-10 (e.g., $I(CF_2)_4I$), and combinations thereof.

In one embodiment, the amorphous fluoropolymer is substantially free of I, or Br, wherein the amorphous fluoropolymer comprises less than 0.1, 0.05, 0.01, or even 0.005 mole percent relative to the total polymer.

Dehydrohalogenation Cure System

The amorphous halogenated polymers disclosed herein are reacted with a cure system such that the halogenated polymer can be cured. The cure composition typically includes one or more components that cause the halogenated polymer chains to link with each other thereby forming a three-dimensional network. In the present disclosure, the halogenated polymer or the halogenated polymer in combination with the cure system should undergo a dehydrohalogenation reaction.

In one embodiment, the dehydrohalogenation cure system comprises at least one of (i) a bisphenol cure system, (ii) an amine-based cure system, (iii) a compound containing at least one terminal olefin with at least one olefinic hydrogen; and (iv) combinations thereof.

A bisphenol cure system as used herein comprises an aromatic polyhydroxy based curing agent. In addition to the aromatic polyhydroxy curing agent, a polyhydroxy curing system generally also comprises one or more organo-onium accelerators. Organo-onium compounds typically contain at least one heteroatom, i.e., a non-carbon atom such as N, P, S, O, bonded to organic or inorganic moieties and include for example ammonium salts, phosphonium salts and iminium salts. One class of useful quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.). Many of the organo-onium compounds are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169. Representative examples include the following individually listed compounds and mixtures thereof:
triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino) phosphonium chloride, and
benzyl(diethylamino)diphenylphosphonium chloride.

Another class of useful organo-onium compounds include those having one or more pendent fluorinated alkyl groups. Generally, the most useful fluorinated onium compounds are disclosed in U.S. Pat. No. 5,591,804 (Coggio et al.).

Polyhydroxy compounds that may be used may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative examples include aromatic polyhydroxy compounds, preferably any one of the following: di-, tri-, and tetrahydroxybenzenes, naphthalenes, and anthracenes, and bisphenols of the following formula:

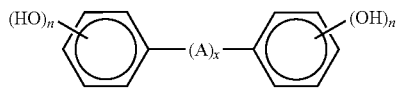

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds may also be used.

A particular useful example of an aromatic polyphenol of the above formula comprises 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A).

An amine based cure system may also be used. The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

In some embodiments, a compound containing at least one terminal olefin with at least one olefinic hydrogen can be used to cure the halogenated polymer. In one embodiment, the compound containing at least one terminal olefin with at least one olefinic hydrogen is represented by the following formula:

$$CX_1X_2=CX_3\text{-L-M}$$

wherein $X_1$, $X_2$, and $X_3$ are independently selected from H, Cl, and F and at least one of $X_1$, $X_2$, and $X_3$ is H and at least one of $X_1$, $X_2$, and $X_3$ is F or Cl; L is a bond or a linking group; and M is a nucleophilic group.

L represents a single bond or a linking group. The linking group can be a catenated O, S, or N atom (e.g., an ether linkage), or a divalent organic group, optionally comprising a catenated heteroatom (e.g., O, S or N), and/or optionally substituted. The divalent organic group may be linear, branched, or cyclic. The divalent organic group may be aromatic or aliphatic. The divalent organic group may be non-fluorinated (comprising no fluorine atoms), partially fluorinated (comprising at least one C—H bond and at least one C—F bond), or perfluorinated (comprising no C—H bonds and at least one C—F bond).

In one embodiment, the divalent organic group is —(CH$_2$)$_n$—(O)$_m$—P—(Rf)$_p$—(P)$_q$— where n is an integer from 1-10; m is 0 or 1; P is selected from at least one of: an aromatic, a substituted aromatic, and (CH$_2$)$_n$ where n is an integer from 1-10; Rf is selected from at least one of: (CF$_2$)$_n$ where n is an integer from 1-10, and C(CF$_3$)$_2$ wherein Rf may be cyclic or aliphatic and/or contain at least one catenated heteroatoms such as O, S and N; p is 0 or 1; and q is 0 or 1. Exemplary divalent organic groups include:
—CH$_2$—C$_6$H$_4$(OCH$_3$)—, —CH$_2$—O—CH$_2$(CF$_2$)$_4$—CH$_2$— and —CH$_2$—O—C$_6$H$_4$—C(CF$_3$)$_2$—C$_6$H$_4$—, and —CH$_2$—O—C$_6$H$_4$—C(CF$_3$)$_2$—C$_6$H$_4$—O—CH$_2$—.

M is a nucleophilic group, meaning it comprises an unshared electron pair. An exemplary nucleophilic group includes: an alcohol (—OH), an amine (—NH$_2$, —NHR, and —NRR' where R and R' are an organic group), a thiol (—SH), and carboxylic acid (—COOH).

In one embodiment, the curing agent comprises at least one nonfluorinated terminal olefin group, in other words, the olefin does not comprise any fluorine atoms. In one embodiment, the curing agent comprises a non-aromatic terminal olefin and/or non-aromatic alcohol.

Exemplary curing agent include:

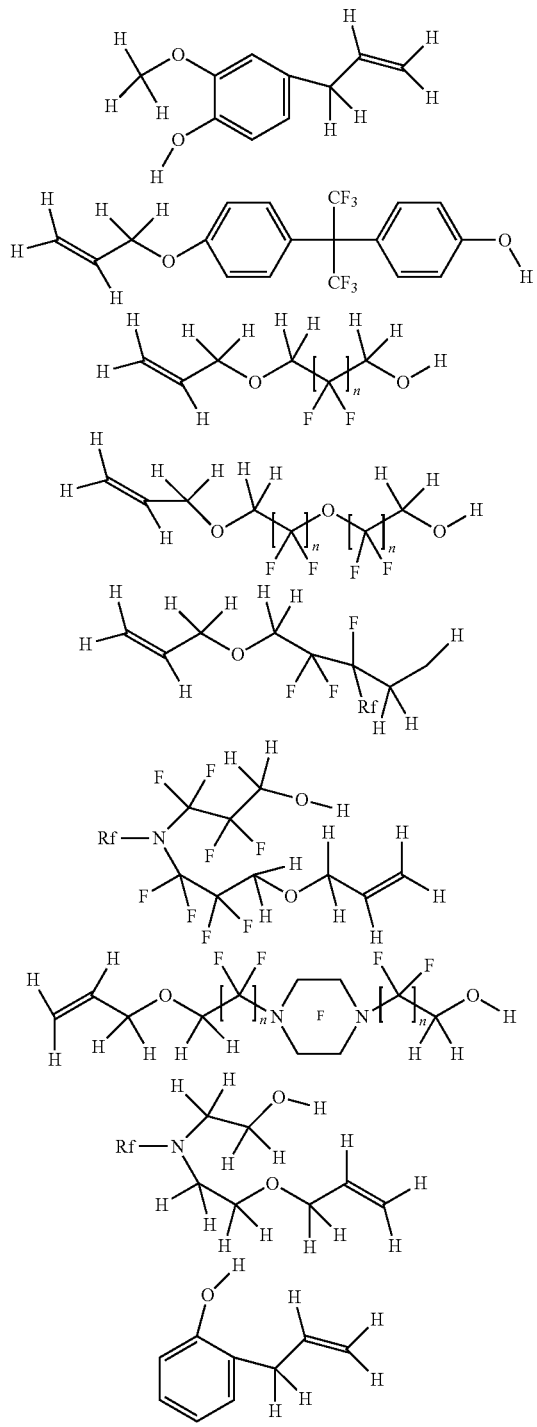

and combinations thereof, where n is independently selected from an integer from 1 to 50, 1 to 20, 1 to 10, or even 2 to 10, and Rf is a fluorinated alkyl group. Rf may be partially or fully fluorinated. In one embodiment, Rf may comprise catenated heteroatoms such as O, S, or N. Rf may be linear or branched, saturated or unsaturated. In one embodiment Rf is a C1 to C12 fluorinated alkyl group (optionally, perfluorinated). The letter "F" in the center of a ring indicated that all unmarked bonds of the ring are fluorine atoms.

Such cure reactions have been disclosed when used in conjunction with a partially fluorinated amorphous fluoropolymer, wherein the partially fluorinated amorphous fluoropolymer comprises carbon-carbon double bonds or is capable of forming carbon-carbon double bonds along the partially fluorinated amorphous fluoropolymer. See WO 2016/100421 (Grootaert et al.) and WO 2016/100420 (Grootaert et al.).

For the cure systems disclosed above, (i) a bisphenol cure system, (ii) an amine-based cure system, (iii) a compound containing at least one terminal olefin with at least one olefinic hydrogen, the curing agent should be used in quantities substantial enough to cause the amorphous halogenated polymer to cure, as indicated by a rise in torque on a moving die rheometer. The amount of cure system can depend on factors known in the art, such as cure system used, the molecular weight, etc. For example, at least 1, 1.5, 2, 2.5, 3, or even 4 or more millimoles per 100 parts of the amorphous halogenated polymer is used. If too little curing agent is used, the amorphous halogenated polymer will not cure. For example, no more than 20, 15, 10, or even 8 millimoles of the curing agent per 100 parts of the amorphous halogenated polymer is used. If too much curing agent is used, the amorphous halogenated polymer can become stiffer and more rigid or even brittle.

In one embodiment, more than one type of cure reaction is used. For example, a peroxide cure system may be used in conjunction with one of the cure systems disclosed above.

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid such as diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide. Examples of the organic peroxide include benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, OO'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluoropolymer. Other conventional radical initiators are suitable for use with the present disclosure.

For the purpose of, for example, enhancing the strength or imparting the functionality, conventional adjuvants, such as, for example, process aids (such as waxes, carnauba wax); plasticizers such as those available under the trade designation "STRUKTOL WB222" available from Struktol Co., Stow, Ohio; fillers; and/or colorants may be added to the composition.

Such fillers include: an organic or inorganic filler such as clay, alumina, iron red, talc, diatomaceous earth, barium sulfate, calcium carbonate ($CaCO_3$), calcium fluoride, titanium oxide, and iron oxide, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound.

In one embodiment, carbon black is added to the composition. Carbon black fillers are typically employed as a means to balance modulus, tensile strength, elongation, hardness, abrasion resistance, conductivity, and processability of fluoropolymer compositions. Suitable examples include MT blacks (medium thermal black) designated N-991, N-990, N-908, and N-907; FEF N-550; and large particle size furnace blacks. When used, 1 to 100 parts filler per hundred parts fluoropolymer (phr) of large size particle black is generally sufficient.

In one embodiment, the composition comprises less than 40, 30, 20, 15, or even 10% by weight of the inorganic filler.

The curable amorphous fluoropolymer compositions may be prepared by mixing the amorphous halogenated polymer, the silicon-containing compound, the acid acceptor, and the curing agent, along with the other components (e.g., additional additives) in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

Curing is typically achieved by heat-treating the curable amorphous fluoropolymer composition. Typically, a first curing is performed followed by a second post curing step.

The first curing is done to crosslink the article to an extent such that the shape can be maintained in order to form (or pre-form) a target shape, which can be further shaped if desired.

The first curing, referred to herein as a press cure, is conducted by exposing an amorphous halogenated polymer to temperatures of at least 120, 140, or even 150° C.; and at most 220° C. or even 200° C., for a period of at least 1, 5, 15, 20, or even 30 minutes; and at most 0.75, 1, 5, 10, or even 15 hours using techniques known in the art, such as an injection molding machine, compression molding machine, transfer molding machines, vulcanizing press, extrusion molding followed by salt bath or autoclave curing, or the like. In one embodiment, a pressure of at least 700, 1000, 2000, 3000, or even 3400 kPa; and at most 6800, 7500, 10 000, 15 000, or even 20 000 kPa is typically used in compression molding. The molds first may be coated with a release agent and prebaked.

The second curing step, referred to herein as a post-cure, is conducted for the purpose of completing the cross-linking reaction that was not sufficient in the press cure or gasifying low molecular components in the elastomer for enhanced strength and decreased compression set. Post-cures are typically done at a temperature of at least 120, 140, or even 150° C.; and at most 200, 220, 250 or even 300° C., for a period of at least 10, 15, 30, or even 60 minutes; and at most 2, 5, 10, 15, 24, 36, or even 48 hours depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In the present disclosure, it has been discovered that when the molded elastomeric article is post cured, a superficial layer is generated at or near the surface. The superficial layer is silicon-containing and appears to comprise Si—O bonds. In one embodiment, the superficial silicon layer comprises silicon dioxide. In one embodiment, the superficial layer is amorphous. The superficial layer is a layer meaning that it is continuous or substantially continuous (covers at least 75, 80, 85, 90, 95, or even 99% of the layer surface) across surface of the article. The superficial layer is at or near the surface of the cured article, meaning that the superficial layer is at the surface or within 200, 100, 50, or even 10 nm of the surface.

Figure 4:
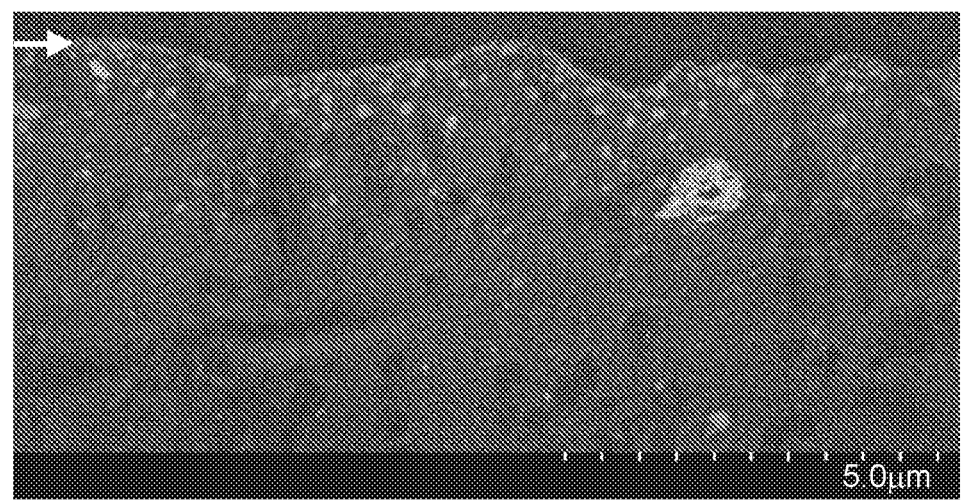
FIG. 4 is a scanning electron micrograph of a cross-section of EX-5.
Figure 5:
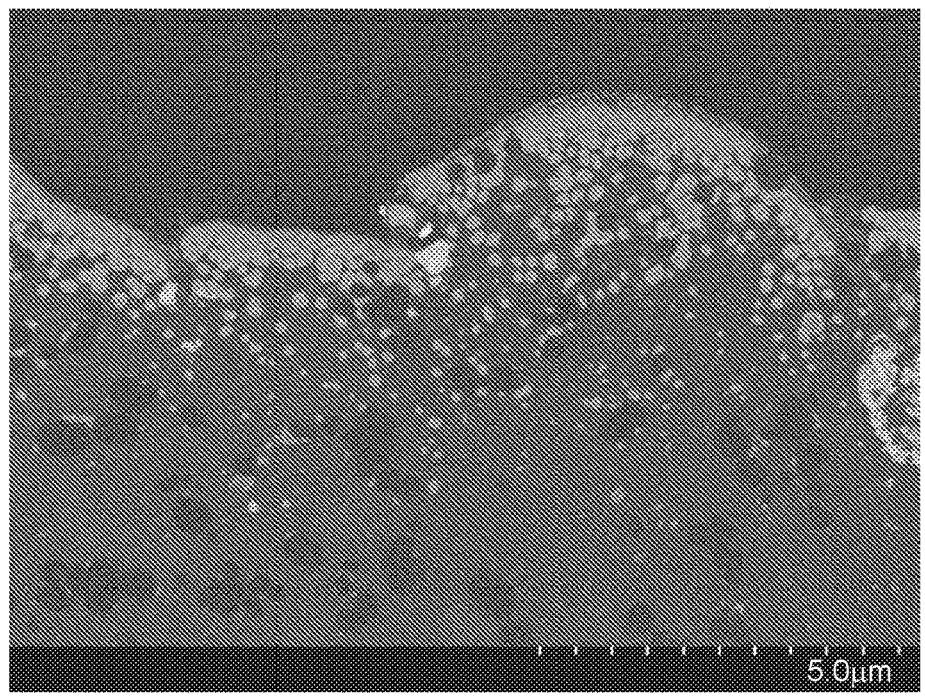
FIG. 5 is a scanning electron micrograph of a cross-section of EX-6.
Figure 6:
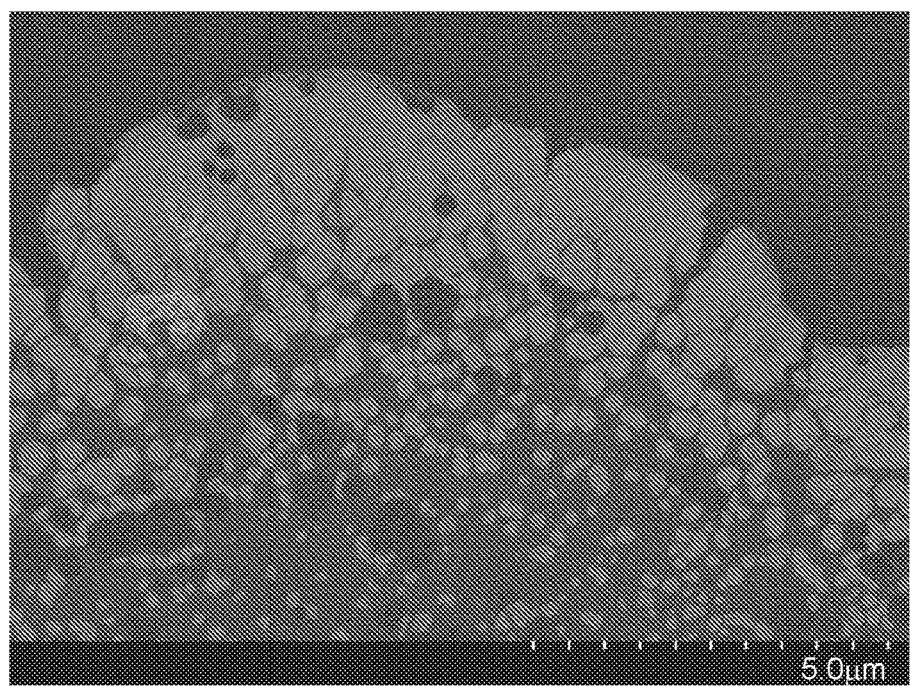
FIG. 6 is a scanning electron micrograph of a cross-section of EX-9.

A superficial layer comprising silicon is shown by the arrow in FIG. 4. As shown in the figure, the layer comprises a dense phase at or near the surface, which decreases in density from the superficial layer toward the bulk. In one embodiment, this dense phase is at least 60, 70, 80, or even 90% visually dense. This dense phase is at least 0.1, 0.3, 0.5, 1, 3, 5, 10, or even 50 μm in average depth. The depth of the dense phase can be determined by cross sectioning the sample and analyzing by SEM. The depth of the dense phase would be an average of the thickness of the layer taken across multiple points of the sample, measured from the start (or top) of the dense phase and ending where the individual silicon-containing phases stopped agglomerating with the continuous dense phase.

In one embodiment, the cured product has more than 2, 5, 10, or even 20 times greater silicon content at the surface of the superficial silicon layer than the bulk composition, which can be analyzed by XRF (x-ray fluorescence) or FTIR (Fourier Transform infrared spectroscopy).

In one embodiment, the thickness of the superficial layer may be dependent on temperatures used and the amount of time exposed, as shown in the Examples below.

To form this superficial layer, the compounded material should comprise an amorphous halogenated polymer, a silicon-containing compound, an effective amount of acid acceptor, and have the ability to dehydrohalogenate. To form the superficial layer, it is believed that the halogenated elastomer compound must be exposed to a level of heat for a sufficient amount of time and that the surface must be able to freely liberate gases. In one embodiment, the surface of the molded article is oxidative, in other words comprising oxygen gas, water or some other compound which is able to donate oxygen atoms readily.

As can been seen in the Example Section, the presence of Si at the surface can be measured using techniques such as FTIR and XRF. In one embodiment, the % Si content measured by XRF increases upon longer post cure, while the % F content decreases. By taking the ratio of the Si to F, one can compare the surface ratio to the theoretical ratio of the bulk and/or observe the Si to F ratio change upon longer post cure times. In one embodiment, the theoretical ratio of Si to halogen (as determined by components in the composition) is at least 0.001, or even 0.005; and no more than 0.01 or even 0.05. In one embodiment, the surface of the cured composition (e.g., the superficial layer) has a ratio of Si to F of at least 0.05, 0.1, 0.2, 0.4, or even 0.5 as determined by XRF.

Although not wanting to be limited by theory, it is believed that heating causes the formation of HF, which abstracts Si from the silicon-containing compound to form $SiF_4$. This gaseous product then migrates to the surface of the elastomeric gum, where it forms the superficial silicon layer. This process is believed to not only deposit silicon to the surface of the elastomeric part, but also to create a textured surface. Such a textured surface is observed in FIG. 2.

The textured surface, which appears as a matte finish on the halogenated elastomer, appears to coincide with the formation of the superficial layer.

In one embodiment, the textured surface is undulated and can be described in terms of the average peak to valley distance and/or average peak to peak distance on the surface. In one embodiment, the average peak to valley distance is at least 3.5 or even 5 micrometers. In one embodiment, the average peak to peak distance is at least 5, 10, 15, or even 20 micrometers.

Advantageously, the compositions of the present disclosure can have low tackiness, low friction, and/or a surface roughness.

Compositions of the present disclosure may be used in shaped articles, such as an o-ring, a gasket, belts, valves, stoppers, seals, hoses, etc. For example, compositions of the present disclosure may be used in rotary shaft seals (such as crank shaft seals), valves (such as solenoid valves, regulator valves, gas on-off valves, water valves), valve stem seals, gas seals, oil seals, fuel cap gaskets, oil level gauges, and hard disk drive components (such as seals, impact absorbing stopper, dampers, gaskets, and balancers).

Compositions of the present disclosure may be used in durable surface applications. In one embodiment, the compositions disclosed herein may be made into films which are applied to substrates to provide durability (e.g., abrasion and/or scratch resistance) to the substrate's surface. The substrate, for example, may be in the form of a clothing article or footwear; automobile, marine, or other vehicle seat coverings; automobile, marine, or other vehicle bodies; orthopedic devices; electronic devices (including, for example, track pads, and outer surface cover), hand held devices, and wearable devices (including watches, sensors and monitoring devices); household appliances; sporting goods; and the like. In another embodiment, compositions disclosed herein may be made (e.g., molded) into wearable devices for body parts such wrist, arm, or leg. In one embodiment, such wearable devices include watches, sensors and monitoring devices which may comprise accelerometers, gyroscopes, inertial sensors, global positioning, motion sensors, heart rate monitors, etc.

Exemplary embodiments of the present disclosure include, but should not be limited to the following.

Embodiment 1. A curable halogenated amorphous polymer composition comprising:
(a) a halogenated amorphous polymer having at least 25% halogen by weight;
(b) at least 0.5 phr of an acid acceptor;
(c) at least 0.1 phr of a silicon-containing compound; and
(d) a dehydrohalogenation cure system.

Embodiment 2. A curable halogenated amorphous polymer composition comprising:
(a) a halogenated amorphous polymer having at least 25% halogen by weight;
(b) at least 0.5 to at most 10 phr of an acid acceptor;
(c) at least 0.01 phr of a silicon-containing compound; and
(d) a dehydrohalogenation cure system.

Embodiment 3. The composition of any one of the previous embodiments, wherein the halogenated amorphous polymer is a fluorinated amorphous polymer or a chlorinated amorphous polymer.

Embodiment 4. The composition of embodiment 3, wherein the fluorinated amorphous polymer comprises at least one of: (i) a copolymer having tetrafluoroethylene, vinylidene fluoride, and hexafluoropropylene; (ii) a copolymer having tetrafluoroethylene, and propylene; (iii) a copolymer having tetrafluoroethylene, vinylidene fluoride, and propylene; and (iv) a copolymer having vinylidene fluoride, perfluoro (methyl vinyl) ether, and hexafluoropropylene; and (v) a copolymer having tetrafluoroethylene, vinylidene fluoride, and hexafluoropropylene.

Embodiment 5. The composition of of embodiment 3, wherein the fluorinated amorphous polymer comprises is a block copolymer comprising at least one A block and at least one B block.

Embodiment 6. The composition of embodiment 5 wherein the A block comprises 30-85 wt % TFE; 5-40 wt % HFP; and 5-55 wt % VDF; and the B block comprises 25-65 wt % VDF and 15-60 wt % HFP; or even 35-60 wt % VDF and 25-50 wt % HFP based on the weight of the fluorinated elastomeric gum.

Embodiment 7. The composition of any one of the previous embodiments, comprising at most 7 phr of the acid acceptor.

Embodiment 8. The composition of any one of the previous embodiments, wherein the acid acceptor comprises at least one of MgO, $Ca(OH)_2$, and hydrotalcite.

Embodiment 9. The composition of any one of the previous embodiments, comprising at most 5 phr of the silicon-containing compound.

Embodiment 10. The composition of any one of the previous embodiments, wherein the silicon-containing compound is inorganic.

Embodiment 11. The composition of any one of embodiments 1-8, wherein the silicon-containing compound is organic.

Embodiment 12. The composition of any one of the previous embodiments, wherein the silicon-containing compound is a particle.

Embodiment 13. The composition of embodiment 12, wherein the silicon-containing compound is a nanoparticle.

Embodiment 14. The composition of embodiment 12, wherein the silicon-containing compound is a glass bubble.

Embodiment 15. The composition of any one of embodiments 1-11, wherein the silicon-containing compound is a liquid.

Embodiment 16. The composition of embodiment 15, wherein the silicon-containing compound is a tetraalkoxysilane.

Embodiment 17. The composition of any one of the previous embodiments, wherein the dehydrohalogenation cure system comprises at least one of (i) a bisphenol cure system, (ii) a amine-based cure system, (iii) $CX_1X_2=CX_3$-L-M
wherein $X_1$, $X_2$, and $X_3$ are independently selected from H, Cl, and F and at least one of $X_1$, $X_2$, and $X_3$ is H and at least one is F or Cl; and (iv) combinations thereof.

Embodiment 18. The composition of any one of the previous embodiments, further comprising carbon black.

Embodiment 19. The composition of any one of the previous embodiments, further comprising a peroxide cure system.

Embodiment 20. The composition of any one of the previous embodiments comprising: at least 0.5 phr and at most 4 phr of the acid acceptor, wherein the acid acceptor is $Ca(OH)_2$, and at least 0.05 phr and at most 5 phr of the silicon-containing compound.

Embodiment 21. The composition of any one of embodiments 1-19 comprising: at least 0.5 phr and at most 7 phr of the acid acceptor, wherein the acid acceptor is MgO, and at least 0.05 phr and at most 5 phr of the silicon-containing compound.

Embodiment 22. The composition of any one of embodiments 1-19 comprising: at least 0.5 phr and at most 5 phr of the acid acceptor, wherein the acid acceptor is hydrotalcite, and at least 0.05 phr and at most 5 phr of the silicon-containing compound.

Embodiment 23. A method of making a halogenated elastomer having a superficial layer comprising silicon, the method comprising:
(a) obtaining the composition of any one of embodiments 1-21;
(b) heating the composition in an unrestrained fashion at a temperature of at least 160° C. for at least 15 min.

Embodiment 24. An article comprising
a halogenated elastomer having a superficial layer comprising silicon, wherein the halogenated elastomer comprises at least 0.01 phr of silicon-containing inorganic compound in the bulk; and there is a concentration gradient of silicon doixide, which decreases from the superficial layer toward the bulk.

Embodiment 25. The article of embodiment 24, wherein the superficial layer is an amorphous silicon dioxide.

Embodiment 26. The article of any one of embodiments 24-25, wherein the superficial layer is at least 0.1 micrometers in depth.

Embodiment 27. An article comprising;
a halogenated elastomer wherein the first major surface of the halogenated elastomer has a superficial layer comprising silicon and is undulated.

Embodiment 28. The article of embodiment 27, wherein the undulated first major surface has an average peak to valley distance of at least 3.5 micrometer.

Embodiment 29. The article of any one of embodiments 27-28, wherein the undulated first major surface has an average peak to peak distance of at least 15 micrometers.

Embodiment 30. An elastomer article comprising the cured composition of any one embodiments 1-22, wherein the elastomer article comprises a silicon content at the surface of the elastomer article which is at least two times the silicon content of the bulk.

Embodiment 31. The elastomer article of embodiment 30, wherein the the elastomer article comprises a silicon content at the surface of the elastomer article which is at least ten times the silicon content of the bulk.

Embodiment 32. A halogen-containing amorphous polymer compound comprising: a bulk portion with a superficial layer thereon, the superficial layer having a first weight ratio of Si to halogen and the bulk portion having a second weight ratio of Si to halogen, wherein the first weight ratio is greater than the second weight ratio; and the weight ratio of Si to halogen gradually decreases from the superficial layer to the bulk portion.

Embodiment 33. The halogen-containing amorphous polymer compound of embodiment 32, wherein the bulk portion has a ratio of Si to halogen of less than 0.01.

Embodiment 34. The halogen-containing amorphous polymer compound of any one of embodiments 32-33, wherein the superficial has a ratio of Si to halogen of greater than 0.1 as determined by XRF.

Embodiment 35. A cured article, the cured article obtainable by curing a composition comprising (a) a halogenated amorphous polymer having at least 25% halogen by weight, wherein the a halogenated amorphous polymer is partially halogenated; (b) at most 4 phr of an acid acceptor, wherein the acid acceptor is selected from an oxide or hydroxide of a divalent metal; and (c) at least 0.05 and at most 5 phr of a silicon-containing compound, with a bisphenol cure system.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Miss., or may be synthesized by conventional methods. These abbreviations are used in the following examples: phr=parts per hundred rubber, g=grams, min=minutes, h=hours, ° C.=degrees Celsius, nm=nanometers, μm=micrometers, mm=millimeters, cm=centimeters, in=inch, rpm= revolutions per minute, w %=weight percent, kV= kiloVolts.

Materials

| | |
|---|---|
| Fluoroelastomer A | VDF/HFP copolymer characterized by a Mooney viscosity (ML 1 + 10 @ 121° C.) of 29 and a fluorine content of 65.9% available as FC 2145 from 3M, St. Paul, MN. |
| Fluoroelastomer B | Curative incorporated TFE/HFP/VDF terpolymer characterized by a Mooney viscosity (ML 1 + 10 @ 121° C.) of 37 and a fluorine content of 70.1% available as FE 5840 from 3M, St. Paul, MN. |
| Fluoroelastomer C | Curative 1 (1.58 phr), Curative 2 (0.55 phr) and Curative 3 (0.61 phr) mixed with 100 phr of Fluoroelastomer A. |
| Elastomer D | Epichlorohydrin copolymer (ECO) characterized by a Mooney viscosity (ML 1 + 4 @ 100° C.) of 65 and a chlorine content of 25% by weight available under the trade designation "Epichlomer C" from Osaka Soda Co. Ltd., Osaka, Japan, |
| Curative 1 | 2,2-Bis(4-hydroxyphenyl) hexafluoropropane (bisphenol AF) |
| Curative 2 | 4,4'-(Hexafluoroisopropylidene)diphenol Benzyltriphenylphosphonium Salt (1:1) |
| Curative 3 | Phenol, 4,4'-[2,2,2-trifluoro-1-(trifluoromethyl) ethylidene]bis-, reaction products with benzene, chlorine and sulfur chloride |
| Curative 4 | 50% benzyl triphenyl phosphonium chloride in methanol |
| Curative 5 | 70% 2,2-Bis(4-hydroxyphenyl) hexafluoropropane (bisphenol AF) in ethanol |
| Creative 6 | N,N'-Dicinnamylidene-1,6-hexanediamine commercially available from The Chemours Company, Wilmington, DL under the trade designation "Diak #3" |
| Curative 7 | A 40% active rubber accelerator available under the trade designation "3M ™ Dynamar ™ Rubber Curative FX 5166," from 3M. |
| TAIC (neat) | A co-agent. Triallyl isocyanurate commercially available under the trade designation "TAIC" from Nippon Kasei Chemical Co. Ltd., Tokyo, Japan. |
| TAIC-DLC-A | A co-agent. 72% triallyl isocyanurate on silicon dioxide commercially available from Natrochem, Inc., Savannah, GA, under the trade designation "TAIC-DLC-A" |

-continued

| | |
|---|---|
| SiO$_2$ | Precipitated silicon dioxide characterized by a median particle size of 40 μm, available under the trade designation "HI-SIL ABS" from PPG Industries, Inc., Monroeville, PA, USA |
| Si | Silicon, (325 mesh powder), available from Sigma-Aldrich |
| glass bubbles | Hollow glass microspheres, (0.46 g/cm$^3$, D50 particle size 20 μm) available under the trade designation "3M ™ Glass Bubbles iM16K" from 3M Company |
| TEOS | Tetraethyl orthosilicate, available from Sigma-Aldrich Company |
| CaSiO$_3$ | Fine particle size, low aspect ratio grade of chemically modified wollastonite, available under the trade designation "Wollastocoat 10222" from NYCO Minerals, Willsboro, NY, USA |
| Carbon Black | N990 carbon black commercially available from Cabot, Boston, MA |
| Ca(OH)$_2$ | An acid acceptor. Calcium hydroxide commercially available under the trade designation "Hallstar Calcium Hydroxide HP-XL" from The Hallstar Company, Chicago, IL. |
| MgO 1 | An acid acceptor. Magnesium oxide powder commercially available from Akrochem Corp., Akron, Ohio under the trade designation "ELASTOMAG 170" (surface area: 165 m$^2$/g) |
| MgO 2 | An acid acceptor. Magnesium oxide powder commercially available from The Hallstar Company, Chicago, IL, under the trade designation "Maglite Y" (surface area: 65 m$^2$/g) |
| Hydrotalcite | An acid acceptor. Hydrotalcite, Mg$_{4.3}$Al$_2$(OH)$_{12.6}$CO$_3$ mH$_2$O commercially available from Kisuma Americas Inc., Houston, TX, under the trade designation "DHT-4A" (surface area: 10.1 m$^2$/g) |

Method for Determining Presence of SiO$_2$ on Surface by FTIR Spectrophotometry:

FTIR (Fourier Transform infrared) spectra were measured from the surface of press cured and post cured sheets using a Spectrum 100 FTIR (available from Perkin Elmer, Waltham, Mass., USA) with MIRACLE Single Reflection ATR sampling accessory and Ge crystal (both available from Pike Technologies, Madison, Wis., USA). A peak at around 1072 cm$^{-1}$ was assigned to Si—O stretching, while a peak at around 1179 cm$^{-1}$ was assigned to Si—F stretching, and a peak around 1103 cm$^{-1}$ was assigned to Si—Cl stretching. In the data tables below, T refers to a trace peak observed, W refers to a weak peak observed, and S refers to a strong peak observed.

Method for Preparing Cured Fluoroelastomer Samples for SEM Microscopy:

A piece of each of sample EX-5 and CE-12 was cut out using a scalpel and attached to an SEM (scanning electron microscopy) stub using double sided carbon tape. A thin layer of AuPd was deposited to make the pieces conductive. The surfaces of interest were examined at lkx magnification at a 45 degree tilt angle using 10 kV, 10 mm wd, SE (secondary electron) detector with a 7001f Field Emission Scanning Electron Microscope available from JEOL USA, Inc., Peabody, Mass. An image of CE-12 is presented in FIG. 1 and an image of EX-2 is presented in FIG. 2.

A piece from each of EX-6, EX-7, EX-8 and EX-11 was cut out with a scalpel at room temperature, skived with a scalpel to decrease thickness, and embedded in epoxy. A scalpel was used to section the embedded samples on a plane normal to the surface of interest. The samples were mounted on cross-section polisher stubs and individually cut with a IB-09010 cross-section polisher (available from JEOL Tokyo, Japan) for approximately 2.5-4 h at 5.5 kV. Cross section areas were then examined at 10 kx magnification using 0.8 kV, 4 mm wd, LABSE (low angle backscatter) detector with a SU8230 Field Emission Scanning Electron Microscope available from Hitachi High Technologies, Shaumburg, Ill., USA.

A piece of EX-21 was cut out with a scalpel at room temperature. The sample was cut with a scalpel at room temperature to reveal a cross-section and mounted on an SEM stub using double sided carbon tape. A thin layer of AuPd was deposited to make the sample conductive. The sample was examined at 500× magnification using BSE (backscattered electron) imaging using 10 kV, 10 mm wd, with a 6010LA Scanning Electron Microscope available from JEOL USA, Inc. The cross section at the surface exposed to atmosphere during post cure is shown in FIG. 7 and the cross section at the surface adjacent to the steel plate during post cure is shown in FIG. 8.

In Table 3, EX-5 through EX-12 the thickness of the superficial layer is reported. This thickness was reported as a range taken by examining the thinnest and thickest portions of the superficial layer in the image. The depth was measured from the top of the densified layer and ending where the individual silicon-containing phases stopped agglomerating with the upper continuous densified phase.

Method for Measuring Cure Rheology:

Cure rheology tests were carried out using uncured, compounded samples using a rheometer marketed under the trade designation Monsanto Moving Die Rheometer (MDR) Model 2000 by Monsanto Company, Saint Louis, Miss., in accordance with ASTM D 5289-93a at 177° C., no pre-heat, 30 min elapsed time (unless otherwise specified), and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_s2$), the time for the torque to reach a value equal to $M_L+0.5(M_H-M_L)$, (t'50), and the time for the torque to reach $M_L+0.9(M_H-M_L)$, (t'90) as well as the tan(delta) at $M_L$ and $M_H$. Tan(delta) is equal to the ratio of the tensile loss modulus to the tensile storage modulus (lower tan(delta) means more elastic).

Method for Determining Wear Performance:

Following post curing, disk samples with a diameter of 1.25 in (3.18 cm) were punched from sheets of EX-6 through EX-11 using a circular die. A circle was cut from the center of each sample with a circular die of diameter 5/16 in (0.79 cm). A ball/pin-on-disk friction test was carried out on each sample using a model UMT friction tester (available from CETR, Campbell, Calif., USA) with the following conditions: ambient temperature, 150 g force applied using a 3/8 in (0.95 cm) diameter stainless steel ball, 1000 rpm, 60 minutes duration, clockwise direction. The reported values for friction force (Fx) and coefficient of friction (COF) for EX-6 through EX-11 are presented in Table 3.

Method for Determining Si Weight % by WDXRF:

Samples analyzed by a wave dispersed X-ray fluorescence (WDXRF) spectrophotometer were 4 cm diameter disks cut from 2 mm thick molded sheets after press curing and again after post curing. For each sample, the analyzed surface was the surface opposite the steel plate during post curing. XRF spectra were collected and analyzed using a Supermini200 WDXRF spectrophotometer (available from Rigaku, The Woodlands, Tex., USA). Si % reported represents the weight % of Si in the measured volume. The estimated sampling depth was approximately 50-60 μm.

Examples 1 and 2 (EX-1 and EX-2)

Figure 2:
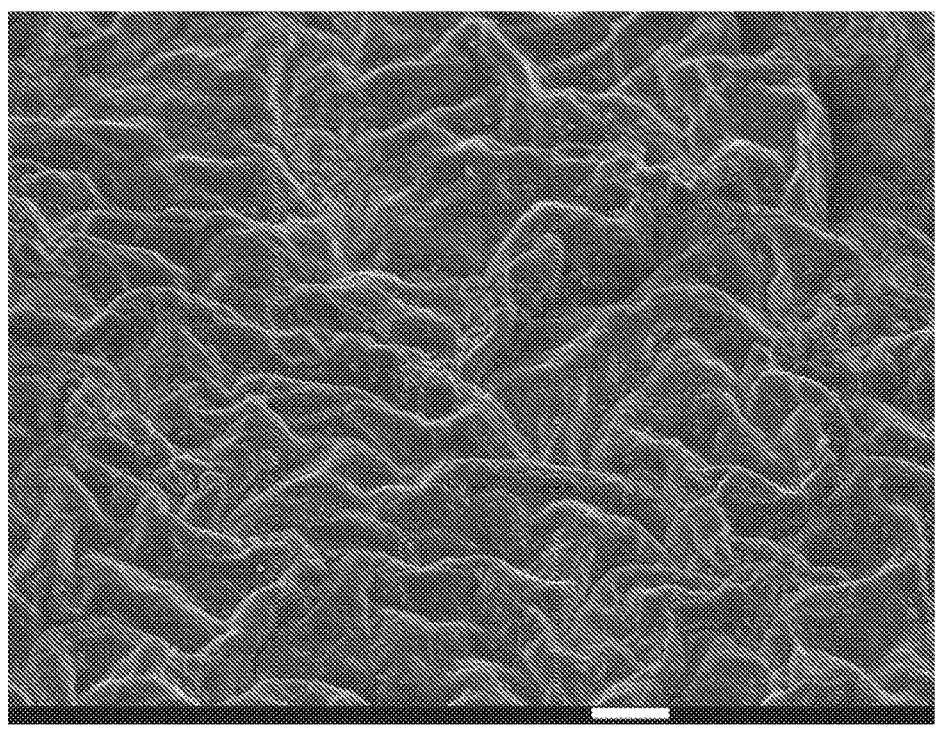
FIG. 2 is a scanning electron micrograph of a top-view of EX-2.
Figure 3:
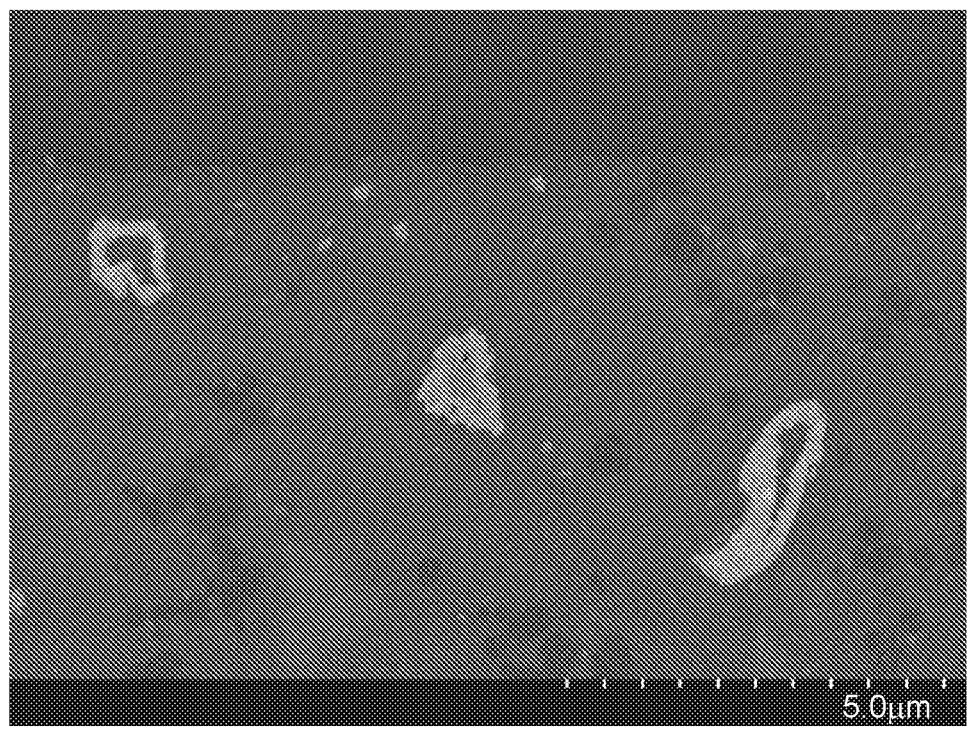
FIG. 3 is a scanning electron micrograph of a cross-section of CE-14.

For EX-1 and EX-2, Fluoroelastomer C was compounded with other ingredients, as presented in Table 1, using a two roll mill. The compound was press cured as a sheet at 177° C. for 30 min using a 15.24 cm×15.24 cm sheet mold unless otherwise specified. After press curing, the sheet was cut using a circular die with 4 cm diameter; cut samples were placed on a steel plate and post cured at 250° C. for one hour in an air-circulated oven. Presence or absence of a silicon-containing superficial layer was identified by FTIR ATR surface analysis and noted in Table 1. A clear peak at around 1072 cm$^{-1}$ was assigned to Si—O stretching. The Si—O stretching was observed for EX-1 and EX-2 after post cure (Table 1). FIG. 2 presents a tilt oriented scanning electron micrograph of the surface of EX-2.

Counter Examples 1 Through 6 (CE-1 Through CE-6)

Fluoroelastomer C was compounded, press cured and post cured as described for EX-1, except as indicated in Table 1.

Shown in Table 1 below is the composition of examples, the theoretical amount of Si and F based on the composition and its ratio, compounding conditions, cure rheology, FTIR spectrophotometry results and WDXRF spectrophotometry results for EX-1 through EX-2 and CE-1 through CE-6.

Examples 3 Through 4 (EX-3 Through EX-4)

For EX-3 and EX-4, Fluoroelastomer C was compounded with other ingredients, as presented in Table 2, using a two roll mill. The compound was press cured as a sheet at 177° C. for 30 min using a 15.24 cm×15.24 cm sheet mold unless otherwise specified. After press curing, the sheet was cut using a circular die with 4 cm diameter; cut samples were placed on a steel plate and post cured at 250° C. for one hour in an air-circulated oven, unless indicated otherwise in Table 2. Presence or absence of a superficial layer comprising silicon was identified by FTIR ATR surface analysis and noted in Table 2.

Counter Examples 7 Through 12 (CE-7 Through CE-12)

For CE-7 through CE-12, Fluoroelastomer C was compounded with other ingredients, as presented in Table 2, using a two roll mill. The compound was press cured as a sheet at 177° C. for 30 min using a 15.24 cm×15.24 cm sheet mold. After press curing, the sheet was cut using a circular die with 4 cm diameter; cut samples were placed on a steel plate and post cured at 250° C. for one hour in an air-circulated oven, except for CE-9, wherein the post cure oven contained a nitrogen atomosphere. Presence or absence of a superficial layer comprising silicon was identified by FTIR ATR surface analysis and noted in Table 2. FIG. 1 presents a tilt oriented scanning electron micrograph of the surface of CE-12.

Shown in Table 2 below is the composition of examples, a summary of compounding conditions, visual surface appearance, and FTIR spectrophotometry results for EX-3 through EX-4 and CE-7 through CE-12.

TABLE 1

| Component | CE-1 | CE-2 | EX-1 | EX-2 | CE-3 | CE-4 | CE-5 | CE-6 |
|---|---|---|---|---|---|---|---|---|
| Fluoroelastomer C | 100 | 100 | 100 | 100 | 100 | 100 | 100 | 100 |
| Carbon Black | 15 | 15 | 15 | 15 | 15 | 15 | 15 | 15 |
| Ca(OH)$_2$ | 0 | 1 | 2 | 3 | 5 | 10 | 20 | 3 |
| SiO$_2$ | 0.7 | 0.7 | 0.7 | 0.7 | 0.7 | 0.7 | 0.7 | 0 |
| theor. % Si | 0.28 | 0.28 | 0.28 | 0.28 | 0.27 | 0.26 | 0.24 | 0 |
| theor. % F | 57.0 | 56.5 | 56.0 | 55.5 | 54.6 | 52.4 | 48.6 | 55.8 |
| theor. Si/F ratio | 0.005 | 0.005 | 0.005 | 0.005 | 0.005 | 0.005 | 0.005 | 0.0 |
| Cure rheology by MDR | | | | | | | | |
| 177° C. (min) | 60 | 60 | 30 | 30 | 30 | 30 | 30 | 30 |
| ML (dNm) | 0.2 | 0.3 | 0.3 | 0.3 | 0.4 | 0.6 | 0.8 | 0.3 |
| MH (dNm) | 0.3 | 2.3 | 9.9 | 12.6 | 14.2 | 15.7 | 17.2 | 15.2 |
| delta torque (dNm) | 0.0 | 2.0 | 9.5 | 12.2 | 13.8 | 15.1 | 16.5 | 14.9 |
| ts2 (min) | — | — | 9.3 | 5.7 | 5.7 | 2.5 | 1.7 | 5.6 |
| t'50 (min) | 57.5 | 16.8 | 10.5 | 6.5 | 6.5 | 2.7 | 1.9 | 6.5 |
| t'90 (min) | 58.7 | 25.5 | 12.6 | 8.3 | 8.3 | 3.5 | 2.6 | 9.4 |
| tan delta ML | 1.8 | 1.6 | 1.4 | 1.4 | 1.4 | 1.2 | 1.1 | 1.6 |
| tan delta MH | 1.584 | 0.300 | 0.067 | 0.041 | 0.041 | 0.041 | 0.049 | 0.034 |
| Press cure conditions and results | | | | | | | | |
| Press cure min@177° C. | NR | NR | 30 | 30 | 30 | 30 | 30 | 30 |
| Si (%) by XRF | NR | NR | 0.26 | 0.29 | 0.28 | 0.48 | 0.30 | 0.05 |
| F (%) by XRF | NR | NR | 56.0 | 56.8 | 57.8 | 53.4 | 53.4 | 53.8 |
| XRF Si/F ratio | NR | NR | 0.005 | 0.005 | 0.005 | 0.009 | 0.006 | 0.001 |
| Post cure conditions and results | | | | | | | | |
| Post cure (h) @250° C. | NR | NR | 1 | 1 | 1 | 1 | 1 | 1 |
| FTIR peak at 1072 cm$^{-1}$ | NR | NR | S | S | No | No | No | No |
| FTIR peak at 1179 cm$^{-1}$ | NR | NR | No | No | S | S | S | S |
| Si (%) by XRF | NR | NR | 7.8 | 8.1 | 0.29 | 0.31 | 0.28 | 0.05 |
| F (%) by XRF | NR | NR | 22.8 | 19.0 | 56.6 | 54.7 | 52.8 | 54.7 |
| XRF Si/F ratio | NR | NR | 0.342 | 0.424 | 0.005 | 0.006 | 0.005 | 0.001 |

NR = Not Run and S = strong

TABLE 2

| Component | CE-7 | CE-8 | EX-3 | CE-9 | CE-10 | EX-4 | CE-11 | CE-12 |
|---|---|---|---|---|---|---|---|---|
| Fluoroelastomer C | 100 | 100 | 100 | 100 | 100 | 100 | 100 | 100 |
| Carbon Black | 15 | 15 | 15 | 15 | 15 | 15 | 15 | 15 |
| $Ca(OH)_2$ | 9 | 6 | 3 | 3 | 3 | 3 | 3 | 3 |
| TAIC-DLC-A | 2.5 | 2.5 | 2.5 | 2.5 | 0 | 0 | 0 | 0 |
| TAIC (neat) | 0 | 0 | 0 | 0 | 1.8 | 0 | 0 | 0 |
| $SiO_2$ | 0 | 0 | 0 | 0 | 0 | 0 | 0 | 0 |
| DBPH-50 | 0 | 0 | 0 | 0 | 0 | 1.5 | 0 | 0 |
| DBPH neat | 0 | 0 | 0 | 0 | 0 | 0 | 0.75 | 0 |
| Cure rheology by MDR | | | | | | | | |
| ML (dNm) | 0.4 | 0.3 | 0.3 | NM | 0.3 | 0.3 | 0.3 | 0.4 |
| MH (dNm) | 14.5 | 14.1 | 13.0 | NM | 13.3 | 12.2 | 12.0 | 13.2 |
| delta torque (dNm) | 14.1 | 13.8 | 12.8 | NM | 13.0 | 11.9 | 11.7 | 12.8 |
| ts2 (min) | 2.1 | 3.0 | 5.3 | NM | 5.5 | 6.5 | 7.4 | 7.0 |
| t'50 (min) | 2.3 | 3.3 | 6.1 | NM | 6.4 | 7.3 | 8.3 | 8.1 |
| t'90 (min) | 3.4 | 4.8 | 8.5 | NM | 9.0 | 11.0 | 12.1 | 11.2 |
| tan delta ML | 1.3 | 1.4 | 1.4 | NM | 1.5 | 1.4 | 1.4 | 1.3 |
| tan delta MH | 0.014 | 0.018 | 0.015 | NM | 0.016 | 0.013 | 0.020 | 0.017 |
| Post cure results | | | | | | | | |
| Visual Appearance | Shiny | Shiny | Shiny/Matte | Shiny | Shiny | Shiny | Shiny | Shiny |
| FTIR peak at 1072 $cm^{-1}$ | No | No | S | No | No | S | No | No |
| FTIR peak at 1179 $cm^{-1}$ | S | S | No | S | S | No | S | S |

NM = not measured and S = strong

Examples 5 Through 9 (EX-5 Through EX-9) and Comparative Examples 13 Through 15 (CE-13 Through CE-15)

For EX-5 to EX-9 and CE-13 through CE-15, Fluoroelastomer C was compounded, press cured and post cured as described for EX-2, except with post cure temperatures and times presented in Table 3, below, and with the following additional exceptions: for CE-13, there was no post cure, for CE-15, there was no press cure. Scanning electron micrographs of cross sections of CE-14, EX-5, EX-6, and EX-9 are presented in FIGS. 3, 4, 5 and 6, respectively.

Shown in Table 3 below is a summary of the pre and post cure conditions, surface visual appearance, FTIR spectrophotometry results, tribology measurement results, and WDXRF results for CE-13 through CE-15 and EX-5 through EX-9.

TABLE 3

| | Example Number | | | | | | | |
|---|---|---|---|---|---|---|---|---|
| | CE-13 | CE-14 | EX-5 | EX-6 | EX-7 | EX-8 | EX-9 | CE-15 |
| Press cure time (min) | 30 | 30 | 30 | 30 | 30 | 30 | 30 | 0 |
| Post cure time (min) | 0 | 5 | 15 | 30 | 60 | 60 | 960 | 60 |
| Post cure temperature (° C.) | NA | 250 | 250 | 250 | 250 | 232 | 250 | 250 |
| Post cure results | | | | | | | | |
| Visual Appearance | Shiny* | Shiny | Matte | Matte | Matte | Matte | Matte | Shiny |
| FTIR peak at 1072 $cm^{-1}$ | No* | No | S | S | S | S | S | No |
| FTIR peak at 1179 $cm^{-1}$ | S* | S | W | No | No | No | No | S |
| Fx (g) | NM | −196 | −165 | −160 | −101 | −155 | −96.9 | NM |
| COF | NM | 1.30 | 1.10 | 1.08 | 0.69 | 1.03 | 0.66 | NM |
| Superficial layer thickness (nm, from SEM) | NA | NA | 90-100 | 460-1000 | NM | NM | 760-3000 | NA |
| Si (%) by XRF | 0.29* | 0.34 | 3.1 | 6.4 | 8.5 | NM | 12.5 | NM |
| F (%) by XRF | 57.1 | 55.5 | 40.4 | 24.9 | 19.5 | NM | 10.4 | NM |
| XRF Si/F ratio | 0.005 | 0.006 | 0.077 | 0.257 | 0.436 | NM | 1.19 | NM |

NM = Not Measured,
S = Strong,
W = Weak, and
NA = Not Applicable
*testing done on press cured sample.

Examples 10 Through 16 (EX-10 to EX-16)

For EX-10 through EX-16, Fluoroelastomer C was compounded with other ingredients, as presented in Table 4, using a two roll mill. The compound was press cured as a sheet at 177° C. for 60 min using a 15.24 cm×15.24 cm sheet mold unless otherwise specified. After press curing, the sheet was cut using a circular die with 4 cm diameter; cut samples were placed on a steel plate and post cured at 250° C. for one hour in an air-circulated oven, unless indicated otherwise in Table 4. Presence or absence of a superficial layer comprising silicon was identified by FTIR ATR surface analysis and noted in Table 4.

Shown in Table 4 below is the composition of examples, the theoretical amount of Si and F based on the composition and its ratio, compounding conditions, cure rheology, FTIR spectrophotometry results and WDXRF spectrophotometry results for EX-10 through EX-16.

Examples 17 Through 20 (EX-17 Through EX-20)

For EX-17 through EX-20, Fluoroelastomer C was compounded with other ingredients, as presented in Table 5, using a two roll mill. The compound was press cured as a sheet at 177° C. for 30 min using a 15.24 cm×15.24 cm sheet mold. After press curing, the sheet was cut using a circular die with 4 cm diameter; cut samples were placed on a steel plate and post cured at 250° C. for one hour in an air-circulated oven. Presence or absence of a superficial layer comprising silicon was identified by FTIR ATR surface analysis and noted in Table 5. Scanning electron micrographs of a cross section of EX-18 are presented in FIGS. 7 and 8, with FIG. 7 showing the surface opposite the steel plate during post curing and FIG. 8 showing the surface adjacent to the steel plate during post curing.

Shown in Table 5 below is the composition of examples, the theoretical amount of Si and F based on the composition and its ratio, compounding conditions, cure rheology, FTIR spectrophotometry results and WDXRF spectrophotometry results for EX-17 through EX-20.

TABLE 4

| Component | EX-10 | EX-11 | EX-12 | EX-13 | EX-14 | EX-15 | EX-16 |
|---|---|---|---|---|---|---|---|
| Fluoroelastomer C | 100 | 100 | 100 | 100 | 100 | 100 | 100 |
| Carbon Black | 15 | 15 | 15 | 15 | 15 | 15 | 15 |
| MgO 1 | 3 | 5 | 6 | 0 | 0 | 0 | 0 |
| MgO 2 | 0 | 0 | 0 | 3 | 5 | 6 | 10 |
| $SiO_2$ | 0.7 | 0.7 | 0.7 | 0.7 | 0.7 | 0.7 | 0.7 |
| theor. % Si | 0.28 | 0.27 | 0.27 | 0.28 | 0.27 | 0.27 | 0.26 |
| theor. % F | 55.5 | 54.6 | 54.1 | 55.5 | 54.6 | 54.1 | 52.4 |
| theor. Si/F ratio | 0.005 | 0.005 | 0.005 | 0.005 | 0.005 | 0.005 | 0.005 |
| Cure rheology by MDR | | | | | | | |
| 177° C. (min) | 60 | 60 | 60 | 60 | 60 | 60 | 30 |
| ML (dNm) | 0.4 | 0.4 | 0.4 | 0.3 | 0.4 | 0.4 | 0.4 |
| MH (dNm) | 1.9 | 8.3 | 12.2 | 2.2 | 14.7 | 15.8 | 18.0 |
| delta torque (dNm) | 1.5 | 7.9 | 11.8 | 1.9 | 14.4 | 15.4 | 17.6 |
| ts2 (min) | — | 16.6 | 13.0 | — | 17.4 | 14.2 | 7.5 |
| t'50 (min) | 26.0 | 22.5 | 19.2 | 39.2 | 24.1 | 17.8 | 8.9 |
| t'90 (min) | 51.1 | 46.3 | 38.7 | 56.0 | 39.1 | 27.7 | 12.1 |
| tan delta ML | 1.4 | 1.4 | 1.4 | 1.5 | 1.4 | 1.4 | 1.4 |
| tan delta MH | 0.453 | 0.105 | 0.075 | 0.375 | 0.057 | 0.036 | 0.036 |
| Press cure conditions and analysis | | | | | | | |
| Press cure (min) @177° C. | NR | 60 | 60 | NR | 60 | 60 | 30 |
| FTIR peak at 1072 $cm^{-1}$ | NR | No | No | NR | T | W | T |
| FTIR peak at 1179 $cm^{-1}$ | S | S | S | NR | S | S | S |
| Si (%) by XRF | NR | 0.23 | 0.74 | NR | 0.48 | 0.82 | 0.64 |
| F (%) by XRF | NR | 52.5 | 51.2 | NR | 53.1 | 50.9 | 50.5 |
| XRF Si/F ratio | NR | 0.004 | 0.014 | NR | 0.009 | 0.016 | 0.013 |
| Post cure conditions and analysis | | | | | | | |
| Post cure (hour) @250° C. | NR | 1 | 1 | NR | 1 | 1 | 1 |
| FTIR peak at 1072 $cm^{-1}$ | NR | S | W | NR | S | S | No |
| FTIR peak at 1179 $cm^{-1}$ | NR | No | S | NR | No | No | S |
| Si (%) by XRF | NR | 7.4 | 0.88 | NR | 2.5 | 6.6 | 0.46 |
| F (%) by XRF | NR | 22.4 | 50.4 | NR | 47.7 | 23.1 | 51.4 |
| XRF Si/F ratio | NR | 0.329 | 0.017 | NR | 0.052 | 0.287 | 0.009 |

T = trace,
W = weak, and
S = strong
NR = not run

TABLE 5

| Formulation | EX-17 | EX-18 | EX-19 | EX-20 |
|---|---|---|---|---|
| Fluoroelastomer C | 100 | 100 | 100 | 100 |
| Carbon Black | 15 | 15 | 15 | 15 |
| Ca(OH)$_2$ | 3 | 3 | 3 | 3 |
| Si | 0.7 | — | — | — |
| glass bubbles | — | 0.7 | — | — |
| TEOS | — | — | 2.4 | — |
| CaSiO$_3$ | — | — | — | 4.7 |
| Theor. Si (F) | 0.59 | 0.28 | 0.27 | 0.93 |
| Theor. F (%) | 55.5 | 55.5 | 54.7 | 53.7 |
| Theor. Si/F ratio | 0.011 | 0.005 | 0.005 | 0.017 |
| Cure rheology by MDR | | | | |
| 177° C. (min) | 30 | 30 | 30 | 30 |
| ML(dNm) | 0.3 | 0.4 | 0.3 | 0.3 |
| MH(dNm) | 14.2 | 13.4 | 14.7 | 15.2 |
| delta torque (dNm) | 13.9 | 13.0 | 14.5 | 14.9 |
| ts2 (min) | 6.8 | 8.8 | 3.8 | 5.6 |
| t'50 (min) | 7.8 | 10.0 | 4.4 | 6.5 |
| t'90 (min) | 11.6 | 12.8 | 6.3 | 9.4 |
| tan delta ML | NR | 1.3 | 1.4 | 1.6 |
| tan delta MH | NR | 0.049 | 0.042 | 0.034 |
| Press cure conditions and results | | | | |
| Press cure (min) @ 177° C. | 30 | 30 | 30 | 30 |
| FTIR peak at 1072 cm$^{-1}$ | T | No | No | W |
| FTIR peak at 1179 cm$^{-1}$ | S | S | S | S |
| Si (%) by XRF | 0.62 | 0.30 | 0.35 | 0.88 |
| F (%) by XRF | 54.9 | 54.8 | 54.7 | 53.8 |
| XRF Si/F ratio | 0.011 | 0.006 | 0.006 | 0.016 |
| Post cure conditions and results | | | | |
| Post cure time @250° C. (hour) | 1 | 1 | 1 | 1 |
| FTIR peak at 1072 cm$^{-1}$ | S | S | S | S |
| FTIR peak at 1179 cm$^{-1}$ | No | No | No | No |
| Si (%) by XRF | 9.1 | 6.0 | 7.1 | 8.5 |
| F (%) by XRF | 18.2 | 25.9 | 22.8 | 18.1 |
| XRF Si/F ratio | 0.498 | 0.232 | 0.313 | 0.47 |

T = trace,
W = weak and
S = strong
NR = not run

Examples 21 Through 24 (EX-21 Through EX-24) and Comparative Example 16 (CE-16)

For EX-21 through EX-24 and CE-16, Fluoroelastomer A or Fluoroelastomer B, as indicated in Table 6, was compounded with other ingredients, as presented in Table 6, using a two roll mill. The compound was press cured as a sheet at 177° C. for 30 min using a 15.24 cm×15.24 cm sheet mold. After press curing, the sheet was cut using a circular die with 4 cm diameter; cut samples were placed on a steel plate and post cured at 250° C. for one hour in an air-circulated oven. Presence or absence of a superficial layer comprising silicon was identified by FTIR ATR surface analysis and noted in Table 6.

Shown in Table 6 below is the composition of examples, the theoretical amount of Si, F and Cl based on the composition and its ratio, compounding conditions, cure rheology, FTIR spectrophotometry results and WDXRF spectrophotometry results for EX-21 through EX-24 and CE-16.

TABLE 6

| Formulation | EX-21 | EX-22 | CE-16 | E-23 | EX-24 |
|---|---|---|---|---|---|
| Fluoroelastomer A | 100 | 100 | 100 | 0 | 0 |
| Fluoroelastomer B | 0 | 0 | 0 | 100 | 0 |
| Elastomer D | 0 | 0 | 0 | 0 | 100 |
| Carbon Black | 15 | 15 | 15 | 15 | 15 |
| Ca(OH)$_2$ | 3 | 3 | 3 | 3 | 3 |
| Curative 4 | 1.8 | — | — | — | 0 |
| Curative 5 | 2.6 | — | — | — | 0 |
| Curative 6 | 0 | 3 | 3 | 0 | 0 |
| Curative 7 | 0 | 0 | 0 | 0 | 2 |
| Curative 1 | 0 | 0 | 0 | 0 | 1.3 |
| SiO$_2$ | 0.7 | 0.7 | 0 | 0.7 | 0 |
| Theor. % Si in Sample | 0.30 | 0.27 | 0.00 | 0.28 | 0.23 |
| Theor. F (%) in Sample | 61.0 | 54.1 | 54.5 | 55.5 | NA |
| Theor. Cl (%) in Sample | NA | NA | NA | NA | 20.6 |
| Theor. Si/F ratio | 0.005 | 0.005 | 0.005 | 0.005 | NA |
| Theor. Si/Cl ratio | NA | NA | NA | NA | 0.011 |
| Cure rheology by MDR | | | | | |
| 177° C. (min) | 30 | 30 | 30 | 30 | 20 |
| ML(dNm) | 0.2 | 0.3 | 0.4 | 0.4 | 1.1 |
| MH(dNm) | 6.9 | 13.3 | 12.8 | 8.1 | 8.1 |
| delta torque (dNm) | 6.7 | 12.9 | 12.4 | 7.7 | 7.0 |
| ts2 (min) | 1.7 | 4.5 | 4.7 | 4.6 | 5.5 |
| t'50 (min) | 1.9 | 7.4 | 7.7 | 5.2 | 7.5 |
| t'90 (min) | 3.3 | 13.4 | 14.0 | 8.1 | 14.1 |
| tan delta ML | 1.6 | 1.5 | 1.4 | NR | 0.8 |
| tan delta MH | 0.057 | 0.048 | 0.041 | NR | 0.027 |
| Press cure conditions and results | | | | | |
| Press cure (min) @ 177° C. | 30 | 30 | 30 | 30 | 20 |
| FTIR peak at 1072 cm$^{-1}$ | No | No | No | No | NA |
| FTIR peak at 1179 cm$^{-1}$ | S | S | S | S | NA |
| FTIR peak at 1103 cm$^{-1}$ | NA | NA | NA | NA | S |
| Si (%) by XRF | 0.27 | 0.35 | 0.09 | 0.36 | 0.16 |
| F (%) by XRF | 61.6 | 56.6 | 55.8 | 57.7 | NA |
| XRF Si/F ratio | 0.004 | 0.006 | 0.002 | 0.006 | NA |
| Cl (%) by XRF | NA | NA | NA | NA | 17.4 |
| XRF Si/Cl ratio | NA | NA | NA | NA | 0.009 |
| Post cure conditions and results | | | | | |
| Post cure time @ 250° C. (hour) | 1 | 1 | 1 | 1 | 1 |
| FTIR peak at 1072 cm$^{-1}$ | S | S | No | S | Yes |
| FTIR peak at 1179 cm$^{-1}$ | No | No | S | No | NA |
| FTIR peak at 1103 cm$^{-1}$ | NA | NA | NA | NA | W |
| Si (%) by XRF | 7.3 | 4.9 | 0.11 | 8.2 | 0.5 |
| F (%) by XRF | 35.3 | 31.8 | 54.8 | 14.9 | NA |
| XRF Si/F ratio | 0.206 | 0.153 | 0.002 | 0.551 | NA |
| Cl (%) by XRF | NA | NA | NA | NA | 11.5 |
| XRF Si/Cl ratio | NA | NA | NA | NA | 0.43 |

S = strong and
W = weak
NA = not applicable

Comparative Example 25 (CE-25) and Examples 26 Through 31 (EX-26 Through EX-31)

For EX-26 through EX-31 and CE-25, Fluoroelastomer C, as indicated in Table 7, was compounded with other ingredients, as presented in Table 7, using a two roll mill. The compound was press cured as a sheet at 177° C. for 30 min. After press curing, the sheet was cut using a circular die with 4 cm diameter; cut samples were placed on a steel plate and post cured at 250° C. for one hour in an air-circulated oven. Presence or absence of a superficial layer comprising silicon was identified by FTIR ATR surface analysis and noted in Table 7.

Shown in Table 7 below is the composition of examples, the theoretical amount of Si, F and Ca based on the composition and its ratio, compounding conditions, cure rheology, FTIR spectrophotometry results and WDXRF spectrophotometry results for EX-26 through EX-31 and CE-25.

TABLE 7

|  | CE-25 | EX-26 | EX-27 | EX-28 | EX-29 | EX-30 | EX-31 |
|---|---|---|---|---|---|---|---|
| Fluoroelastomer C | 100 | 100 | 100 | 100 | 100 | 100 | 100 |
| Carbon Black | 15 | 15 | 15 | 15 | 15 | 15 | 15 |
| $Ca(OH)_2$ | 3 | 3 | 3 | 3 | 3 | 3 | 3 |
| $SiO_2$ | 0.0 | 0.5 | 0.7 | 1.0 | 2.0 | 3.0 | 5.0 |
| Theor. % Si in sample | 0.00 | 0.20 | 0.28 | 0.39 | 0.78 | 1.16 | 1.90 |
| Theor. % F in sample | 55.8 | 55.6 | 55.5 | 55.4 | 54.9 | 54.5 | 53.6 |
| Theor. % Ca in sample | 1.38 | 1.37 | 1.37 | 1.36 | 1.35 | 1.34 | 1.32 |
| Theor. Si/F ratio | 0.00 | 0.004 | 0.005 | 0.007 | 0.014 | 0.021 | 0.035 |
| Cure rheology by MDR | | | | | | | |
| Cure time @177° C. (min) | 30 | 30 | 30 | 30 | 30 | 30 | 30 |
| ML (dNm) | 0.4 | 0.4 | 0.4 | 0.4 | 0.4 | 0.4 | 0.4 |
| MH (dNm) | 14.9 | 13.8 | 13.9 | 13.2 | 13.4 | 14.0 | 14.0 |
| delta torque (dNm) | 14.5 | 13.5 | 13.5 | 12.8 | 13.1 | 13.7 | 13.6 |
| ts2 (min) | 7.0 | 5.7 | 6.3 | 7.2 | 6.6 | 6.7 | 8.5 |
| t50 (min) | 8.1 | 6.5 | 7.2 | 8.3 | 7.6 | 7.7 | 10.2 |
| t90 (min) | 11.2 | 9.1 | 9.6 | 11.6 | 10.3 | 10.7 | 14.9 |
| tan delta ML | 1.3 | 1.4 | 1.4 | 1.4 | 1.4 | 1.4 | 1.4 |
| tan delta MH | 0.017 | 0.028 | 0.032 | 0.083 | 0.06 | 0.044 | 0.05 |
| Press cure conditions and results | | | | | | | |
| Press cure time @177° C. (min.) | 30 | 30 | 30 | 30 | 30 | 30 | 30 |
| FTIR peak at 1072 $cm^{-1}$ | No | No | No | No | No | No | No |
| FTIR peak at 1179 $cm^{-1}$ | S | S | S | S | S | S | S |
| Si content by XRF (%) | 0.12 | 0.38 | 0.35 | 0.44 | 0.91 | 1.14 | 1.66 |
| F content by XRF (%) | 55.4 | 55.8 | 55.7 | 56.4 | 54.3 | 55.1 | 52.3 |
| Ca content by XRF (%) | 2.16 | 1.39 | 1.35 | 1.35 | 1.33 | 1.31 | 1.25 |
| Si/F ratio by XRF | 0.002 | 0.007 | 0.006 | 0.008 | 0.017 | 0.021 | 0.032 |
| Post cure conditions and results | | | | | | | |
| Post cure time @250° C. (hour) | 1 | 1 | 1 | 1 | 1 | 1 | 1 |
| FTIR peak at 1072 $cm^{-1}$ | No | S | S | S | S | W | W |
| FTIR peak at 1179 $cm^{-1}$ | S | No | No | No | No | S | S |
| Si content by XRF (%) | 0.12 | 7.89 | 9.88 | 8.43 | 8.42 | 2.14 | 2.51 |
| F content by XRF (%) | 56.3 | 22.2 | 14.9 | 17.9 | 16.7 | 52.8 | 50.9 |
| Ca content by XRF (%) | 2.24 | 1.17 | 1.14 | 1.12 | 0.97 | 1.33 | 1.25 |
| Si/F ratio by XRF | 0.002 | 0.355 | 0.661 | 0.471 | 0.505 | 0.041 | 0.049 |
| Post cure time @250° C. (hour) | 16 | 16 | 16 | 16 | 16 | 16 | 16 |
| FTIR peak at 1072 $cm^{-1}$ | No | S | S | S | S | S | S |
| FTIR peak at 1179 $cm^{-1}$ | S | No | No | No | No | W | W |
| Si content by XRF (%) | 0.2 | 12.1 | 12.3 | 14.3 | 15.0 | 13.0 | 11.0 |
| F content by XRF (%) | 55.9 | 9.3 | 9.1 | 7.1 | 9.5 | 27.1 | 32.8 |
| Ca content by XRF (%) | 2.2 | 1.1 | 1.1 | 0.9 | 0.9 | 1.2 | 1.2 |
| Si/F ratio by XRF | 0.003 | 1.3 | 1.3 | 2.0 | 1.6 | 0.5 | 0.3 |

Examples 32 Through 33 and 35 Through 36 (EX-32, EX-33, EX-35, EX-36) and Comparative Examples 34 and 37 (CE-32 and CE-37)

For EX-32, EX-33, EX-35, EX-36, CE-34, and CE-37; Fluoroelastomer C, as indicated in Table 8, was compounded with other ingredients, as presented in Table 8, using a two roll mill. The compound was press cured as a sheet at 177° C. for 30 min. After press curing, the sheet was cut using a circular die with 4 cm diameter; cut samples were placed on a steel plate and post cured at 250° C. for one hour in an air-circulated oven. Presence or absence of a superficial layer comprising silicon was identified by FTIR ATR surface analysis and noted in Table 8.

Shown in Table 8 below is the composition of examples, the theoretical amount of Si, F, Mg and Ca based on the composition and its ratio, compounding conditions, cure rheology, FTIR spectrophotometry results and WDXRF spectrophotometry results for EX-32, EX-33, EX-35, EX-36, CE-34, and CE-37.

TABLE 8

|  | EX-32 | EX-33 | CE-34 | EX-35 | EX-36 | CE-37 |
|---|---|---|---|---|---|---|
| Fluoroelastomer C | 100 | 100 | 100 | 100 | 100 | 100 |
| Carbon Black | 15 | 15 | 15 | 15 | 15 | 15 |
| $SiO_2$ | 0.05 | 0.05 | 0.05 | 0.05 | 0.05 | 0.05 |
| $Ca(OH)_2$ | 1.5 | 4 | 5 | | | |
| MgO 2 | | | | 4 | 7 | 10 |
| Theor. Si in sample (%) | 0.02 | 0.02 | 0.02 | 0.02 | 0.02 | 0.02 |
| Theor. F in sample (%) | 56.6 | 55.4 | 55.0 | 55.4 | 54.1 | 52.8 |
| Theor. Mg in sample (%) | — | — | — | 2.0 | 3.5 | 4.8 |
| Theor. Ca in sample (%) | 0.7 | 1.8 | 2.3 | — | — | — |
| Theor. Si/F ratio | 0.0004 | 0.0004 | 0.0004 | 0.0004 | 0.0004 | 0.0004 |

TABLE 8-continued

|  | EX-32 | EX-33 | CE-34 | EX-35 | EX-36 | CE-37 |
|---|---|---|---|---|---|---|
| Cure rheology by MDR | | | | | | |
| Cure time @177° C. (min) | 120 | 15 | 12 | 120 | 60 | 20 |
| ML (dNm) | 0.4 | 0.4 | 0.4 | 0.4 | 0.4 | 0.5 |
| MH (dNm) | 3.8 | 12.8 | 15.9 | 5.6 | 11.7 | 16.0 |
| delta torque (dNm) | 3.4 | 12.4 | 15.5 | 5.2 | 11.3 | 15.6 |
| ts2 (min) | 20.1 | 5.2 | 4.4 | 27.1 | 9.9 | 6.3 |
| t50 (min) | 17.9 | 6.0 | 4.9 | 31.7 | 14.1 | 8.4 |
| t90 (min) | 26.4 | 8.6 | 7.0 | 87.4 | 29.0 | 12.9 |
| tan delta ML | 1.4 | 1.4 | 1.4 | 1.5 | 1.4 | 1.5 |
| tan delta MH | 0.3 | 0.1 | 0.0 | 0.2 | 0.1 | 0.0 |
| Press cure conditions and results | | | | | | |
| Press cure time @177° C. (min.) | 60 | 15 | 15 | 120 | 60 | 15 |
| FTIR peak at 1072 cm$^{-1}$ | No | No | No | No | No | No |
| FTIR peak at 1179 cm$^{-1}$ | S | S | S | S | S | S |
| Si content by XRF (%) | 0.1 | 0.1 | 0.1 | 0.1 | 0.1 | 0.0 |
| F content by XRF (%) | 58 | 56 | 55 | 55 | 53 | 51 |
| Mg content by XRF (%) | 0.0 | 0.0 | 0.0 | 1.7 | 3.2 | 4.1 |
| Ca content by XRF (%) | 0.7 | 1.6 | 2.2 | 0.0 | 0.0 | 0.0 |
| Si/F ratio by XRF | 0.0009 | 0.0010 | 0.0020 | 0.0014 | 0.0016 | 0.0009 |
| Post cure conditions and results | | | | | | |
| Post cure time @250° C. (hour) | 1 | 1 | 1 | 1 | 1 | 1 |
| FTIR peak at 1072 cm$^{-1}$ | W | W | No | W | S | No |
| FTIR peak at 1179 cm$^{-1}$ | S | S | S | S | W | S |
| Si content by XRF (%) | 0.53 | 0.92 | 0.05 | 1.2 | 1.2 | 0.1 |
| F content by XRF (%) | 39.7 | 53.4 | 56.6 | 31.3 | 39.4 | 45.8 |
| Mg content by XRF (%) | 0.0 | 0.0 | 0.0 | 0.8 | 1.9 | 3.4 |
| Al content by XRF (%) | 0.0 | 0.0 | 0.0 | 0.0 | 0.0 | 0.0 |
| Ca content by XRF (%) | 0.5 | 1.9 | 2.2 | 0.0 | 0.0 | 0.0 |
| Si/F ratio by XRF | 0.0133 | 0.0172 | 0.0009 | 0.0398 | 0.0312 | 0.0020 |
| Post cure time @250° C. (hour) | 16 | 16 | 16 | 16 | 16 | 16 |
| FTIR peak at 1072 cm$^{-1}$ | S | S | No | S | W | No |
| FTIR peak at 1179 cm$^{-1}$ | W | W | S | W | S | S |
| Si content by XRF (%) | 1.3 | 1.6 | 0.1 | 2.2 | 1.6 | 0.1 |
| F content by XRF (%) | 33.7 | 48.8 | 57.1 | 30.4 | 47.6 | 52.6 |
| Mg content by XRF (%) | 0.0 | 0.0 | 0.0 | 1.0 | 2.7 | 4.2 |
| Ca content by XRF (%) | 0.5 | 1.7 | 2.2 | 0.0 | 0.0 | 0.0 |
| Si/F ratio by XRF | 0.038 | 0.033 | 0.001 | 0.071 | 0.033 | 0.002 |

Examples 38 Through 40 (EX-38-EX-40)

For EX-38-EX-40, Fluoroelastomer C, as indicated in Table 9, was compounded with other ingredients, as presented in Table 9, using a two roll mill. The compound was press cured as a sheet at 177° C. for 30 min. After press curing, the sheet was cut using a circular die with 4 cm diameter; cut samples were placed on a steel plate and post cured at 250° C. for one hour in an air-circulated oven. Presence or absence of a superficial layer comprising silicon was identified by FTIR ATR surface analysis and noted in Table 9.

Shown in Table 9 below is the composition of examples, the theoretical amount of Si, F, Mg and Ca based on the composition and its ratio, compounding conditions, cure rheology, FTIR spectrophotometry results and WDXRF spectrophotometry results for EX-38 through EX-40.

TABLE 9

|  | EX-38 | EX-39 | EX-40 |
|---|---|---|---|
| Fluoroelastomer C | 100 | 100 | 100 |
| Carbon Black | 15 | 15 | 15 |
| SiO$_2$ | 0.05 | 0.05 | 0.05 |
| Hydrotalcite | 2 | 4 | 5 |
| Theor. Si in sample (%) | 0.02 | 0.02 | 0.02 |
| Theor. F in sample (%) | 56 | 55 | 55 |
| Theor. Mg in sample (%) | 0.33 | 0.65 | 0.80 |
| Theor. Al in sample (%) | 0.18 | 0.36 | 0.45 |
| Theor. Si/F ratio | 0.0004 | 0.0004 | 0.0004 |
| Cure rheology by MDR | | | |
| Cure time @177° C. (min) | 120 | 20 | 60 |
| ML (dNm) | 0.3 | 0.3 | 0.3 |
| MH (dNm) | 9.9 | 17.0 | 17.3 |
| delta torque (dNm) | 9.6 | 16.7 | 17.0 |
| ts2 (min) | 15.8 | 6.5 | 5.9 |
| t50 (min) | 24.4 | 7.3 | 6.6 |
| t90 (min) | 42.8 | 9.5 | 8.8 |
| tan delta ML | 1.5 | 1.5 | 1.5 |
| tan delta MH | 0.1 | 0.0 | 0.0 |
| Press cure conditions and results | | | |
| Press cure time @177° C. (min.) | 60 | 15 | 15 |
| FTIR peak at 1072 cm$^{-1}$ | No | No | No |
| FTIR peak at 1179 cm$^{-1}$ | S | S | S |
| Si content by XRF (%) | 0.1 | 0.1 | 0.1 |
| F content by XRF (%) | 57 | 54 | 54 |
| Mg content by XRF (%) | 0.3 | 0.8 | 1.0 |
| Al content by XRF (%) | 0.1 | 0.3 | 0.5 |
| Si/F ratio by XRF | 0.0012 | 0.0026 | 0.0016 |
| Post cure conditions and results | | | |
| Post cure time @250° C. (hour) | 1 | 1 | 1 |
| FTIR peak at 1072 cm$^{-1}$ | S | No | No |
| FTIR peak at 1179 cm$^{-1}$ | W | S | S |
| Si content by XRF (%) | 1.03 | 0.04 | 0.05 |
| F content by XRF (%) | 43.2 | 55.7 | 54.2 |
| Mg content by XRF (%) | 0.23 | 0.76 | 0.97 |

TABLE 9-continued

|  | EX-38 | EX-39 | EX-40 |
|---|---|---|---|
| Al content by XRF (%) | 0.19 | 0.48 | 0.52 |
| Si/F ratio by XRF | 0.0238 | 0.0008 | 0.0009 |
| Post cure time @250° C. (hour) | 16 | 16 | 16 |
| FTIR peak at 1072 cm$^{-1}$ | S | S | W |
| FTIR peak at 1179 cm$^{-1}$ | W | W | S |
| Si content by XRF (%) | 1.1 | 2.5 | 0.6 |
| F content by XRF (%) | 30.8 | 35.0 | 46.9 |
| Mg content by XRF (%) | 0.2 | 0.6 | 0.9 |
| Al content by XRF (%) | 0.3 | 0.9 | 0.7 |
| Si/F ratio by XRF | 0.035 | 0.071 | 0.014 |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable halogenated amorphous polymer composition comprising:
    (a) a halogenated amorphous polymer having at least 25% halogen by weight;
    (b) at least 0.5 phr to at most 4 phr of Ca(OH)$_2$ or at least 0.5 phr to at most 5 phr of hydrotalcite;
    (c) at least 0.01% and less than 10% by weight of a silicon-containing compound based on the weight of the halogenated amorphous polymer; and
    (d) a dehydrohalogenation cure system.

2. The composition of claim 1, wherein the halogenated amorphous polymer is a fluorinated amorphous polymer or a chlorinated amorphous polymer.

3. The composition of claim 1, comprising less than 5% by weight of the silicon-containing compound.

4. The composition of claim 1, wherein the dehydrohalogenation cure system comprises at least one of (i) a bisphenol cure system, (ii) a amine-based cure system, (iii) CX$_1$X$_2$═CX$_3$-L-M wherein X$_1$, X$_2$, and X$_3$ are independently selected from H, Cl, and F and at least one of X$_1$, X$_2$, and X$_3$ is H and at least one is F or Cl; and (iv) combinations thereof.

5. The composition of claim 1, further comprising a peroxide cure system.

6. The composition of claim 1, wherein the acid acceptor is Ca(OH)$_2$, and the composition comprises at least 0.05 phr to at most 5 phr of the silicon-containing compound.

7. The composition of claim 1, wherein the acid acceptor is hydrotalcite, and the composition comprises at least 0.05 phr to at most 5 phr of the silicon-containing compound.

8. A method of making a halogenated elastomer having a superficial layer comprising silicon, the method comprising:
    (a) obtaining the composition of claim 1;
    (b) heating the composition in an unrestrained fashion at a temperature of at least 160° C. for at least 15 min.

9. An article comprising
    a halogenated elastomer having a superficial layer consisting of silicon, wherein the halogenated elastomer comprises (i) at least 0.01% and less than 10% by wt of silicon-containing inorganic compound in the bulk and (ii) at least one of Ca(OH)$_2$ or hydrotalcite; and there is a concentration gradient of silicon dioxide, which decreases from the superficial layer toward the bulk.

10. A cured article, the cured article obtainable by curing a composition comprising (a) a halogenated amorphous polymer having at least 25% halogen by weight, wherein the halogenated amorphous polymer is partially halogenated; (b) at least 0.5 phr to at most 4 phr of Ca(OH)$_2$ or at least 0.5 phr to at most 5 phr of hydrotalcite; and (c) at least 0.05 and at most 5 phr of a silicon-containing compound, with a bisphenol cure system.

11. The article of claim 9, wherein the halogenated elastomer consists of an amorphous halogenated polymer.

12. The composition of claim 1, wherein the silicon-containing compound is a liquid.

13. The composition of claim 1, wherein the silicon-containing compound is organic.

14. The composition of claim 1, wherein the silicon-containing compound is a glass bubble.

15. The composition of claim 1, wherein the silicon-containing compound is a nanoparticle.

16. The composition of claim 1, wherein the composition is substantially free of an-amine-based cure system.

17. The composition of claim 1, comprising at least 0.1% by weight and less than 1% by weight of the silicon-containing compound.

18. The composition of claim 1, comprising at least 0.5% by weight and less than 7% by weight of the silicon-containing compound.

19. The article of claim 9, wherein the article is free of polytetrafluoroethylene or a perfluoroalkoxy alkane (PFA) polymer.

* * * * *